(12) United States Patent
Finkelstein et al.

(10) Patent No.: US 9,818,145 B1
(45) Date of Patent: Nov. 14, 2017

(54) PROVIDING PRODUCT RECOMMENDATIONS BASED ON USER INTERACTIONS

(71) Applicant: Amazon Technologies, Inc., Reno, NV (US)

(72) Inventors: Adam James Finkelstein, Seattle, WA (US); Adam Edward Shirey, Seattle, WA (US); Phivos Costas Avistides, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1120 days.

(21) Appl. No.: 13/906,744

(22) Filed: May 31, 2013

(51) Int. Cl.
*G06Q 30/00* (2012.01)
*G06Q 30/06* (2012.01)

(52) U.S. Cl.
CPC .................. *G06Q 30/0631* (2013.01)

(58) Field of Classification Search
CPC ................................................ G06Q 30/0631
USPC ........................................................ 705/26, 27
See application file for complete search history.

(56) References Cited

U.S. PATENT DOCUMENTS

| | | | | |
|---|---|---|---|---|
| 7,580,861 B1* | 8/2009 | Song | ............... | G06Q 30/0253 705/14.51 |
| 2003/0105682 A1* | 6/2003 | Dicker | ............... | G06Q 30/02 705/26.8 |
| 2005/0154718 A1* | 7/2005 | Payne | ............... | G06F 7/00 |
| 2007/0208729 A1* | 9/2007 | Martino | ............ | G06F 17/30702 |
| 2009/0157486 A1* | 6/2009 | Gross | ............... | G06Q 30/02 705/319 |
| 2009/0172021 A1* | 7/2009 | Kane | ............... | G06F 17/30873 |
| 2011/0184806 A1* | 7/2011 | Chen | ............... | G06K 9/6226 705/14.52 |
| 2013/0091088 A1* | 4/2013 | Forman | ............ | G06F 17/30702 706/54 |
| 2013/0151348 A1* | 6/2013 | Paul | ............... | G06Q 30/0201 705/14.66 |
| 2013/0218687 A1* | 8/2013 | Sohangir | ........... | G06F 17/30867 705/14.66 |

OTHER PUBLICATIONS

"RichRelevance Unveils RichContent," Professional Services Close-UP, Apr. 3, 2013; ProQuest Dialog #1322584743 3pgs.*
Strugatz, Rachel: "Digital Gets Personal," WWD Apr. 15, 2013; ProQuest Dialog #1335346414 8pgs.*

* cited by examiner

*Primary Examiner* — Rob Pond
(74) *Attorney, Agent, or Firm* — Athorus, PLLC

(57) ABSTRACT

Recommendations of items may be provided to a customer who purchases items from an online marketplace on behalf of a user account based on the interactions of the customer with the marketplace or with one or more external resources, such as a social network account affiliated with the customer. For example, systems and methods may utilize such interactions to determine which of the purchases of items on behalf of the user account are affiliated with the customer, and which may be affiliated with one or more other individuals. Similarly, the systems and methods may also identify recommendations for customers who have purchased items for delivery to a destination based on other items that have been delivered to the destination, and may further determine when a customer has purchased an item for a recipient who has already received the item from another customer.

21 Claims, 14 Drawing Sheets

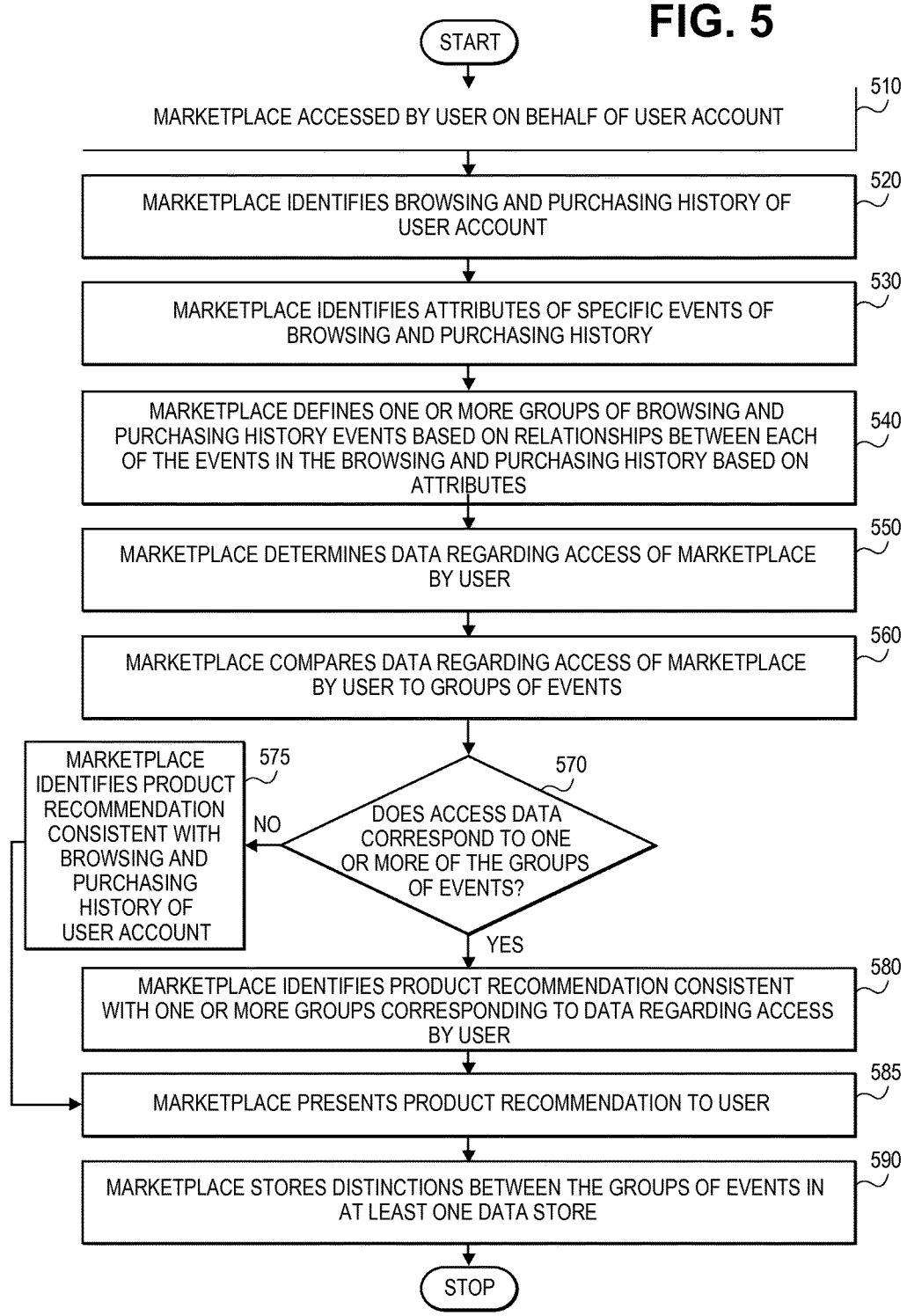

| NO. | DATE | TIME | BROWSER | IP ADDRESS | ITEM | VIEWED? | PURCHASED? |
|---|---|---|---|---|---|---|---|
| 1 | 07 Mar 2013 | 9:15 PM | Browser A.1 | 4.53.58.53 | Leaf Blower | Y | N |
| 2 | 08 Mar 2013 | 12:00 PM | Browser B.1 | 198.228.206.162 | Caribbean Resort Package | Y | N |
| 3 | 09 Mar 2013 | 2:00 PM | Browser B.1 | 198.228.206.165 | "Tourist's Guide to Puerto Rico" | Y | Y |
| 4 | 09 Mar 2013 | 9:30 PM | Browser A.1 | 4.53.58.53 | "Lawn Care for Beginners" | Y | Y |
| 5 | 10 Mar 2013 | 8:45 PM | Browser A.1 | 198.228.207.103 | Zero-Turn Lawn Mower | Y | N |
| 6 | 11 Mar 2013 | 8:55 PM | Browser A.1 | 4.53.58.53 | Riding Tractor Lawn Mower | Y | Y |
| 7 | 12 Mar 2013 | 11:30 AM | Browser B.2 | 4.53.58.57 | "Cayman Cooking Recipes" | Y | Y |
| 8 | 12 Mar 2013 | 9:50 PM | Browser A.1 | 4.53.58.57 | Gasoline Edger/Trimmer | Y | N |
| 9 | 14 Mar 2013 | 8:30 PM | Browser A.2 | 4.53.58.58 | Electric Edger/Trimmer | Y | Y |
| 10 | 15 Mar 2013 | 11:45 AM | Browser B.1 | 198.228.206.167 | Multi-SPF Sunscreen Package | Y | Y |

FIG. 6A

PROVIDING PRODUCT RECOMMENDATIONS BASED ON USER INTERACTIONS

BACKGROUND

Contemporary electronic marketplaces may identify recommendations of items for customers in any number of ways. For example, an online marketplace may recommend an item to a customer based on purchases that were made by the customer in the past, with the expectation that a customer who is interested in a first item that he or she previously purchased may also be interested in a second item that is related to the first item. Likewise, an online marketplace may recommend an item to a customer based on purchases made by other customers, with the expectation that a customer who purchased a first item may be interested in a second item that was purchased by other customers who also purchased the first item.

Occasionally, items may be purchased at an online marketplace for different people on behalf of a single user account, even if the different people have different preferences, interests or tastes. For example, two spouses who live in the same household may elect to order items from an online marketplace using a common user account (viz., a "multi-user account"), particularly where the spouses use a common payment instrument (e.g., credit card or debit card) to pay for their purchased items, or where the purchased items are intended to be delivered to a common destination. Additionally, a child may also order items from an online marketplace using a multi-user account maintained by his or her parents (e.g., books or supplies purchased for use by a student at a boarding school or college). Finally, a customer may purchase items as gifts for others using his or her user account, even though the customer may not have any personal interest in any of the items that are purchased.

Purchases of items that are made by or on behalf of different individuals from a single user account may disrupt or confuse systems or methods that are intended to provide recommendations of items to customers. For example, where the users of a multi-user account have divergent interests, and the online marketplace identifies an item recommendation based on a prior purchase made on behalf of one user of the multi-user account, the item recommendation may be appropriate for that user and inappropriate for others. Likewise, where a customer purchases an item from an online marketplace on behalf of a user account as a gift for another person, any systems or methods that identify recommendations of items based on purchases made on behalf of the user account may be misled into believing that the customer has an emerging interest in the item on the basis of his or her purchase of the gift, which may or may not be accurate. Therefore, existing systems and methods for identifying item recommendations based on actions taken on behalf of a user account maintained at an online marketplace may be inadequate where purchases are made from the user account by or on behalf of multiple individuals.

Furthermore, items may also be purchased from an online marketplace on behalf of multiple, independent user accounts, and delivered to a single individual or a common destination. In such situations, where authorized users of the respective user accounts do not communicate with one another, or even know that each other exists, such users are usually unaware of purchases of items that are made by or on behalf of other user accounts. For example, where an item is purchased for an individual as a gift by a user of one user account, and the gift is neither returned to the marketplace nor refused by the individual, the individual's interest in the item, and the individual's possession of the item, are typically not known to users of other user accounts who may be interested in purchasing one or more items for the individual. Therefore, because existing systems and methods for identifying item recommendations are typically unaware of items that individuals may have received from user accounts other than those with which such individuals are associated, such systems and methods are typically unable to identify recommendations of items to users who may be interested in buying items for such individuals.

BRIEF DESCRIPTION OF THE DRAWINGS

FIG. 5 is a flow chart of a process for providing product recommendations based on user interactions, in accordance with embodiments of the present disclosure.

FIGS. 6A and 6B are representations of data regarding commercial activity on behalf of a user account, in accordance with embodiments of the present disclosure.

DETAILED DESCRIPTION

Figure 1:
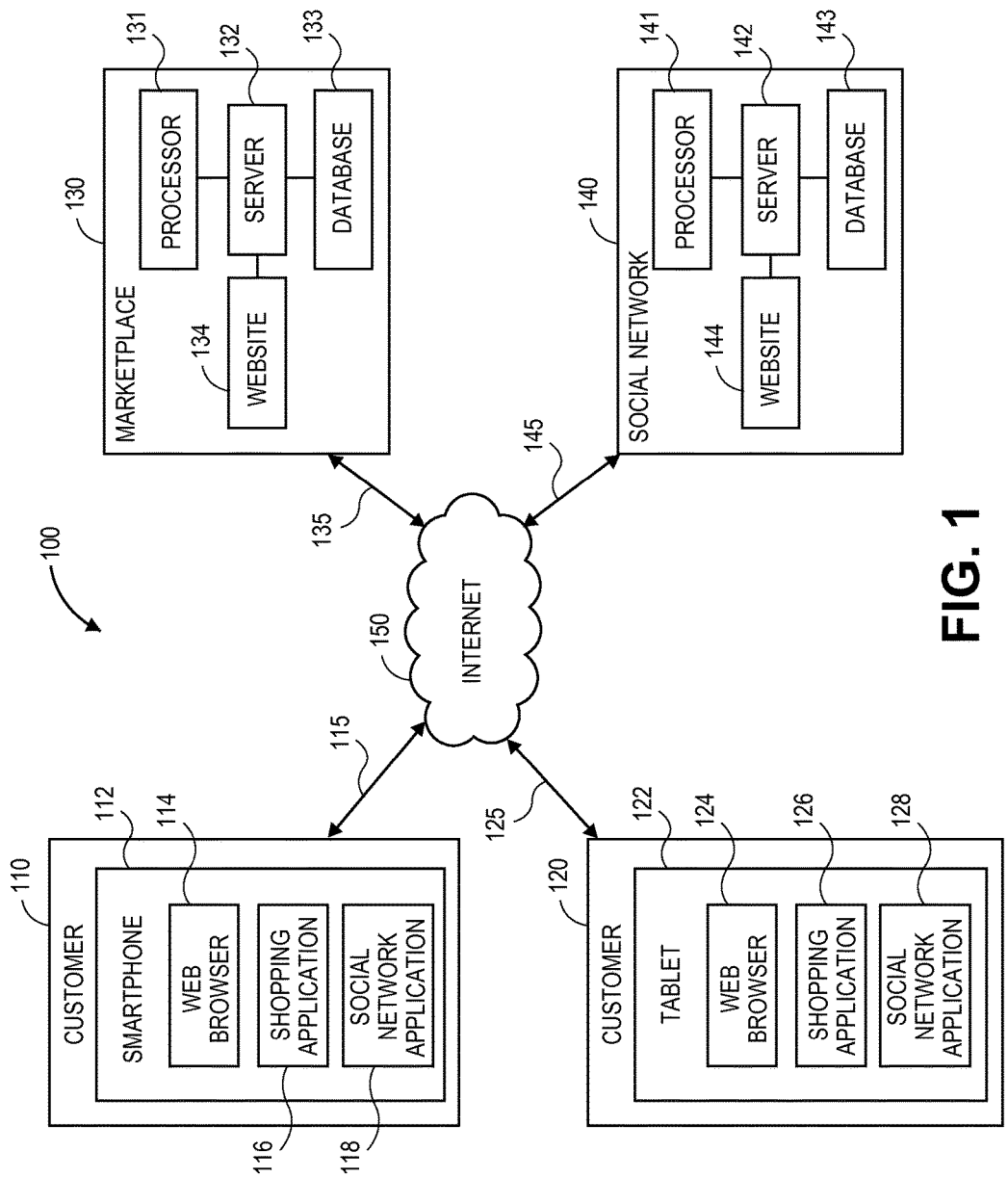
FIG. 1 is a block diagram of a networked system for providing product recommendations based on user interactions, in accordance with embodiments of the present disclosure.

As is set forth in greater detail below, the present disclosure is directed to systems and methods for providing recommendations of items to users of an electronic marketplace based on the users' interactions with the electronic marketplace and/or with one or more external resources, such as a social network or other web site. Specifically, the systems and methods disclosed herein are directed to identifying information regarding commercial activity at an online marketplace on behalf of a user account, and determining whether or how many elements of the commercial activity may be associated with the interests of a given customer who is authorized to make purchases of items from the online marketplace using the user account, or the interests of other individuals. Such commercial activity may include purchases of items by authorized users of the user account, as well as the evaluation of items for purchase by such authorized users, and may be partitioned using any available intrinsic or extrinsic information that may be obtained from one or more external resources. Additionally, the systems and methods disclosed herein may also identify a common recipient of purchases of items from users of multiple user accounts, and may further make recommendations of items for the common recipient to a user of one user account based on purchases made on behalf of the common recipient by a user of a different user account.

For example, the commercial activity may be analyzed with respect to information obtained from one or more social network accounts maintained by one or more authorized users of the user account, or with respect to information that may be available through public means, such as telephone books, directories, land records or other sources of information. Additionally, the commercial activity may also be analyzed with regard to express instructions provided by an authorized user of the user account, who may identify which of the items that were purchased or evaluated for purchase on behalf of the user account should be considered when identifying item recommendations, and which of the items may be ignored or disregarded.

Accordingly, the systems and methods disclosed herein are intended to ensure that appropriate recommendations of items are made to persons associated with a user account, or to persons for whom purchases are made on their behalf from the user account, based on information that may be obtained from one or more external resources, and to enhance the shopping experience of such users thereby.

According to one embodiment of the present disclosure, item recommendations may be provided to respective users of a multi-user account maintained at an electronic marketplace based on information that may be obtained from one or more social network accounts, which may be used to cluster, group, partition or narrow browsing or purchasing data or information, and to associate such data or information with one or more users of the multi-user account.

For example, many social networks (which are sometimes called "social networking sites" or "social networking services") permit their members to enter, or post, information regarding themselves, their families or their friends, or their current or preferred activities or interests; to express their opinions on or preferences for particular issues or topics; or to provide comments or media relating to information entered or posted by themselves or by other members. With the advent and rapid proliferation of mobile communication technology, members of social networks may now access their accounts from not only desktop computers or laptop computers, but also tablet computers and wireless telephones, or "smartphones," wherever access to the Internet is available. For these reasons, a social network account maintained by a customer or user of an electronic marketplace may be a significant source of both contemporary and historical information regarding the user, the user's family or friends, or the user's interests.

Moreover, the dramatic permeation and widespread adoption of social networking throughout all areas of the virtual world has also reached electronic marketplaces, many of which now permit customers to coordinate their access to such marketplaces with their access to social networks. For example, many electronic marketplaces now provide one or more "widgets" or other applications that permit users to access such marketplaces through their social network accounts, or vice versa, and permit such marketplaces to access any information that may be made available or otherwise hosted at or by their social network accounts. Additionally, such widgets or applications may also permit users to post or share information to their social network accounts regarding items that they have purchased from the marketplace, or to express their satisfaction or dissatisfaction with such items accordingly (e.g., by providing reviews or ratings of such products at the social networks). Furthermore, the information that is posted or shared to a social network account, or a blog or other like website, is occasionally made available to the general public.

The systems and methods of the present disclosure may utilize any information that may be made available by a customer of an electronic marketplace at a social network or other external resource to cluster, group, or partition information regarding commercial activity of a multi-user account at an online marketplace, in order to identify the portions of such activity that directly correspond to either the customer or to others who are authorized to make purchases using the multi-user account. The information regarding the user account may be clustered, grouped or partitioned in one or more online or offline processes, and in real time or in near-real time. For example, where a customer authorizes an electronic marketplace to access a social network account of the customer, or when the customer's social network account postings are made available to the public, the systems and methods disclosed herein may review and analyze any available information regarding the customer that may be maintained or stored therein. Some information that may be considered by the systems and methods of the present disclosure includes postings at a social network made by the customer, such as text and/or images, as well as the hyperlinked contents of one or more external resources, or postings at the social network made by other members of the social network that may relate or pertain to the customer.

From such information, for example, the systems and methods of the present disclosure may identify any of the customer's close friends or family members, as well as any of the customer's interests, hobbies or other reasons for having purchased one or more items from an online marketplace. The identities of such friends or family members, as well as the interests, hobbies or reasons of the customer, may be used to identify not only certain purchases of items that may be attributed directly to the customer, but also other individuals who may be authorized users of the multi-user account, as well as purchases made by such other individuals. Once the items that were purchased by one or more of the respective users of the multi-user account are identified, appropriately tailored recommendations of items to the respective users may be provided.

According to yet another embodiment of the present disclosure, any attributes, aspects or other information regarding browsing or purchasing events that are associated with a multi-user account maintained at an online marketplace may be clustered, grouped, partitioned or narrowed and associated with one or more users of the multi-user account. For example, any patterns of activity associated with the use of the multi-user account to access an online marketplace (e.g., any categories of items that are purchased on behalf of the user account; any destinations to which items purchased on behalf of the user account are shipped or delivered; any computers, browsers or Internet Protocol (or "IP") addresses from which the marketplace is accessed on behalf of the user account, or any times of day at which the marketplace is accessed on behalf of the user account) may be identified and associated with one or more of the users of the multi-user account in one or more online or offline processes, and in real time or in near-real time. When the online marketplace is subsequently accessed by one of the users of the multi-user account, any attributes, aspects or other information that may be detected or sensed regarding the access of the online marketplace by that user may be analyzed in order to identify the interests of the user, and to recommend an item to that user accordingly.

For example, where items of one category are frequently purchased by a first user of a multi-user account from an online marketplace at a particular time of day, and the online marketplace is accessed on behalf of the multi-user account at or near that time of day, it may be assumed that the first user is the user of the multi-user account has accessed the online marketplace, and is interested in items in the particular category. Where items of another category are frequently purchased by a second user of a multi-user account who accesses the online marketplace from a particular browser or computing platform, and the online marketplace is accessed on behalf of the multi-user account from the particular browser or platform, it may be assumed that the second user is the user who is accessing the online marketplace, and that the second user is interested in items of the other category. Any other attribute, aspect or information that may be identified from the respective browsing or purchasing events on behalf of a multi-user account may be utilized in identifying one or more users thereof, and in making one or more appropriate recommendations of items to such users.

According to still another embodiment of the present disclosure, a set of items that are owned or possessed by an individual may be defined and recorded, and utilized to provide item recommendations for purchase on behalf of that individual. Where one or more items are ordered on behalf of a common recipient either by the recipient himself or herself, or by users of other user accounts, or delivered to a shipping address associated with the common recipient, information regarding such items may be stored and utilized to identify recommendations of items for purchase on behalf of the common recipient. For example, when a newborn baby arrives, and one of his or her family members is interested in purchasing gifts for the baby, items that have been purchased for the baby by the baby's parents, or by another family member, may serve as a basis for recommending items to the family member, or to anyone else who intends to purchase an item on behalf of the newborn baby. Similarly, if a toddler's maternal grandparents purchase a train set for the toddler, the systems and methods of the present disclosure may recommend a compatible locomotive or accessory to the train set for purchase by the toddler's paternal grandparents, even if the paternal grandparents are unaware of the maternal grandparents' purchase, or if the maternal grandparents are unaware of the paternal grandparents' interest in purchasing a similar item for the toddler.

Moreover, by recording and tracking the items owned by or on behalf of a common recipient, the systems and methods of the present disclosure may attempt to avoid the duplicate purchases of one or more items by or on behalf of the common recipient. For example, where such a recipient is known to possess or have previously received an item, i.e., based on a purchase made by the common recipient through his or her own user account or from another user account, the systems and methods of the present disclosure may inform another user who intends to purchase the item for the common recipient that the common recipient already owns or possesses the item, and invite the other user to select a different item instead. The systems and methods disclosed herein may further define a set of parameters for informing a customer of the user's likely possession of the item, such as a time at which the item was purchased, or a category of the item, which may determine whether the subsequent purchase of the item is an unwanted duplicate, or a desired replacement or additional item.

Accordingly, the systems and methods of the present disclosure may be used to bifurcate or separate data regarding browsing or purchasing events of multiple users of a single common user account into groups or clusters corresponding to one or more of the respective users, to identify a user of the user account corresponding to the respective groups or clusters, and to identify an appropriate item recommendation for the user that befits his or her interests. Groups or clusters of browsing or purchasing events may be defined manually or automatically based on any standard, and may have any size or scope. For example, a group or cluster of events in a browsing or purchasing history may be defined according to one or more machine learning algorithms or techniques, including but not limited to nearest neighbor methods or analyses, artificial neural networks, factorization methods or techniques, K-means clustering analyses or techniques, similarity measures such as log likelihood similarities or cosine similarities, latent Dirichlet allocations or other topic models, or latent semantic analyses.

Using any of the foregoing algorithms or techniques, or any other algorithms or techniques, a relative distance between such events with respect to attributes, aspects or other information (e.g., any categories of items purchased or evaluated for purchase on behalf of a multi-user account; any computers, browsers or IP addresses from which the marketplace is accessed on behalf of the user account, or any times of day at which the marketplace is accessed on behalf of the user account) may be determined, and all events falling within a predefined threshold distance of one another may be placed in or associated with the same group or cluster. Such groups or clusters may be defined for an entire set of events in a browsing or purchasing history, or, alternatively, among a subset, or a training set, of items in the history, and extrapolated among the remaining events in the history. Similarly, a group or a cluster of events in a browsing or purchasing history may be defined based on co-occurrence frequencies, correlation measurements or any other associations of the events with respect to the users of a multi-user account, as well.

Referring to FIG. 1, one system 100 that may operate according to the systems and methods of the present disclosure is shown. As is shown in FIG. 1, the system 100 includes customers 110, 120 (or users, members, consumers, shoppers or buyers), an electronic commerce or Internet-based marketplace 130 (or supplier, retailer, seller, reseller or distributor) and a social network 140, connected to one another across a network 150, such as the Internet.

The customers 110, 120 can be any entities or individuals that wish to download, purchase, rent, lease, borrow, or otherwise obtain items (which may include, but are not limited to, goods, products, services, information or media of any type or form) from the marketplace 130 using a client application, which may include web browsers 114, 124 running on a smartphone 112 or a tablet computer 122, a shopping application 116, 126 that enables customers 110, 120 to make purchases from the marketplace 130 (e.g., a shopping "app" operating on the smartphone 112 or the tablet computer 122), a social network application 118, 128 that enables customers 110, 120 to access the social network 140 (e.g., a social network "app" operating on the smartphone 112 or the tablet computer 122), or any other software component. The customers 110, 120 may connect to or otherwise communicate with the marketplace 130 and/or the social network 140 by sending and receiving digital data over the network 150 using the smartphone 112 and/or the tablet computer 122, which may be connected to the network 150 as indicated by lines 115, 125. The web browsers 114, 124, the shopping applications 116, 126 and/or the social network applications 118, 128 provide one or more user interfaces for the customers 110, 120 to view and/or communicate with the marketplace website 134 and/or the social networking website 144.

Furthermore, those of skill in the pertinent art will recognize that the customers 110, 120 may use a keyboard, keypad, mouse, stylus, touch screen, or other device (not shown) or method for interacting with the smartphone 112, the web browser 114, the shopping application 116 and/or the social network application 118; the tablet computer 122 and/or the web browser 124, the shopping application 126 and/or the social network application 128; the marketplace 130, the server 132 and/or the website 134; the social network 140, the server 142 and/or the website 144, or with any other computer devices that may be utilized in accordance with the present disclosure; or to "select" an item, link, node, hub or any other aspect of the present disclosure.

The marketplace 130 itself may be an entity that sells or otherwise makes items available for download, purchase, rent, lease or borrowing by customers, such as customers 110, 120, from a marketplace website 134 or other processing system. In addition, the items made available at the marketplace 130 or ordered by the customers 110, 120 may be made by or obtained from one or more third party vendors (or merchants or manufacturers), and the marketplace 130 itself may be a vendor, a merchant or a manufacturer.

The marketplace 130 may include or operate one or more physical computer machines or devices having one or more processors 131, servers 132 or databases 133, and may maintain a marketplace web site 134 which may be implemented using one or more of the processors 131, servers 132 or databases 133. Additionally, the marketplace 130 may feature software applications and/or hardware components for analyzing data received from customers, such as the customers 110, 120, including data regarding customers' preferences, purchasing histories or personal information or from one or more external resources. The marketplace 130, the processors 131, servers 132, databases 133, and web site 134 may be connected to or otherwise communicate with the customers 110, 120 by sending and receiving digital data over the network 150, as indicated by lines 115, 125, 135 through the web browsers 114, 124 and/or the shopping applications 116, 126.

The social network 140 may be a platform or hub at which a variety of members that are connected or otherwise linked by one or more distinct relationships may communicate with another through the exchange of information with the platform or hub over the network 150. The social network 140 may be accessed by any number of users, such as customers 110, 120, who may visit a social networking website 144 or other processing system through the web browsers 114, 124, the social network application 118, 128, or any other software application or hardware component, and may otherwise communicate with the network 150, as indicated by line 145, by sending and receiving digital data. The social network 140 may present data or information on one or more standard or customizable interfaces on behalf of each of its members, which may be viewed by select other members (e.g., "friends," "contacts" or "connections") of the social network or the general public, and each of the interfaces may feature text, images or other media, or hyperlinks to external content.

The social network 140 may include or operate one or more physical computer machines or devices having one or more processors 141, servers 142 or databases 143, and may maintain a social networking web site 144 which may be implemented using one or more of the processors 141, servers 142 or databases 143. Additionally, the social network 140 may feature software applications and/or hardware components for analyzing data received from customers, such as the customers 110, 120, including data regarding customers' preferences, purchasing histories or personal information or from one or more external resources. The social network 140, the processors 141, servers 142, databases 143, and/or the web site 144 may be connected to or otherwise communicate with the customers 110, 120 or the marketplace 130 by sending and receiving digital data over the network 150, as indicated by lines 115, 125, 135, 145 through the web browsers 114, 124 and/or the social network applications 118, 128.

In addition to social networks, such as the social network 140 of FIG. 1, those of ordinary skill in the pertinent art would recognize that other external sources of information (not shown) regarding customers, such as the customers 110, 120 of FIG. 1, may be utilized to identify potential users of a multi-user account or to discern between such users, and to identify item recommendations for any such users. For example, the systems and methods of the present disclosure may utilize or interact with external resources such as telephone directories, land records or other sources of information (e.g., to identify individuals who may reside at a location associated with a user account, or at a location where one or more items purchased from an online marketplace on behalf of a user account may be delivered, as well as family members of an authorized user of a user account) regarding the one or more users of a user account.

The computers, servers, devices and the like described herein have the necessary electronics, software, memory, storage, databases or other data stores (such as caches), firmware, logic/state machines, microprocessors, communication links, displays or other visual or audio user interfaces, printing devices, and any other input/output interfaces to perform the functions described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

Process steps described herein as being performed by a "customer," a "marketplace," or a "social network" may be automated steps performed by their respective computer systems, or implemented within software modules (or computer programs) executed by one or more general purpose computers. Moreover, process steps described as being performed by a "customer," a "marketplace," or a "social network" may be typically performed by a human operator via the computers 112, 122 or the servers 132, 142 but could, alternatively, be performed by an automated agent.

The customers 110, 120, the marketplace 130 and the social network 140 may use any web-enabled or Internet applications or features, such as the web browsers 114, 124, the shopping applications 116, 126, the social network applications 118, 128 or the websites 134, 144, or any other client-server applications or features including electronic mail (or E-mail), or other messaging techniques, to connect to the network 150 or to communicate with one another, such as short or multimedia messaging service (SMS or MMS) text messages. In addition, the computers 112, 122 and the servers 132, 142 may include any of a number of computing devices that are capable of communicating over the network, including but not limited to set-top boxes, personal digital assistants, mobile phones including "smartphones," digital media players, web pads, tablet computers, laptop computers, desktop computers, electronic book readers, and the like. The protocols and components for providing communication between the computers 112, 122 and the servers 132, 142 are well known to those skilled in the art of computer communications and thus, need not be described in more detail herein.

The data and/or computer executable instructions, programs, firmware, software and the like (also referred to herein as "computer executable" components) described herein may be stored on a computer-readable medium that is within or accessible by the computers 112, 122 and/or the servers 132, 142, and having sequences of instructions which, when executed by a processor (such as a central processing unit, or CPU), cause the processor to perform all or a portion of the functions and/or methods described herein. Such computer executable instructions, programs, software and the like may be loaded into the memory of the computers 112, 122 and/or the servers 132, 142 using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, read-only memories (ROMs), random access memories (RAMs), erasable programmable read-only memories (EPROMs), electrically erasable programmable read-only memories (EEPROMs), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

For the purposes of illustration, some of the systems and methods disclosed herein may be referenced primarily in the context of identifying information regarding purchases made from an electronic marketplace by one or more customers associated with a user account, such as the customers 110, 120 and the marketplace 130 shown in FIG. 1, bifurcating or separating the information, where applicable, in order to associate aspects of the information with one or more of the customers; and to identify an appropriate item recommendation to the customers based on the information. As will be recognized by those of skill in the art, however, the systems and methods disclosed herein may also be used in many other situations, and are not limited to any of the embodiments described herein.

As is discussed above, the systems and methods of the present disclosure may utilize a customer's interactions with a social network in order to identify one or more connections to the customer (e.g., friends or family members) by or for whom purchases have been made on behalf of a user account, and to tailor item recommendations to the customer, or to one or more of such connections to the customer accordingly. For example, the customer's interactions with the social network may be utilized to determine whether the customer shares a user account with one or more of his or her friends or family members, and to determine which events in a browsing or purchasing history of the user account may be associated with the customer, and which events may be associated with his or her friends or family members.

Figure 2:
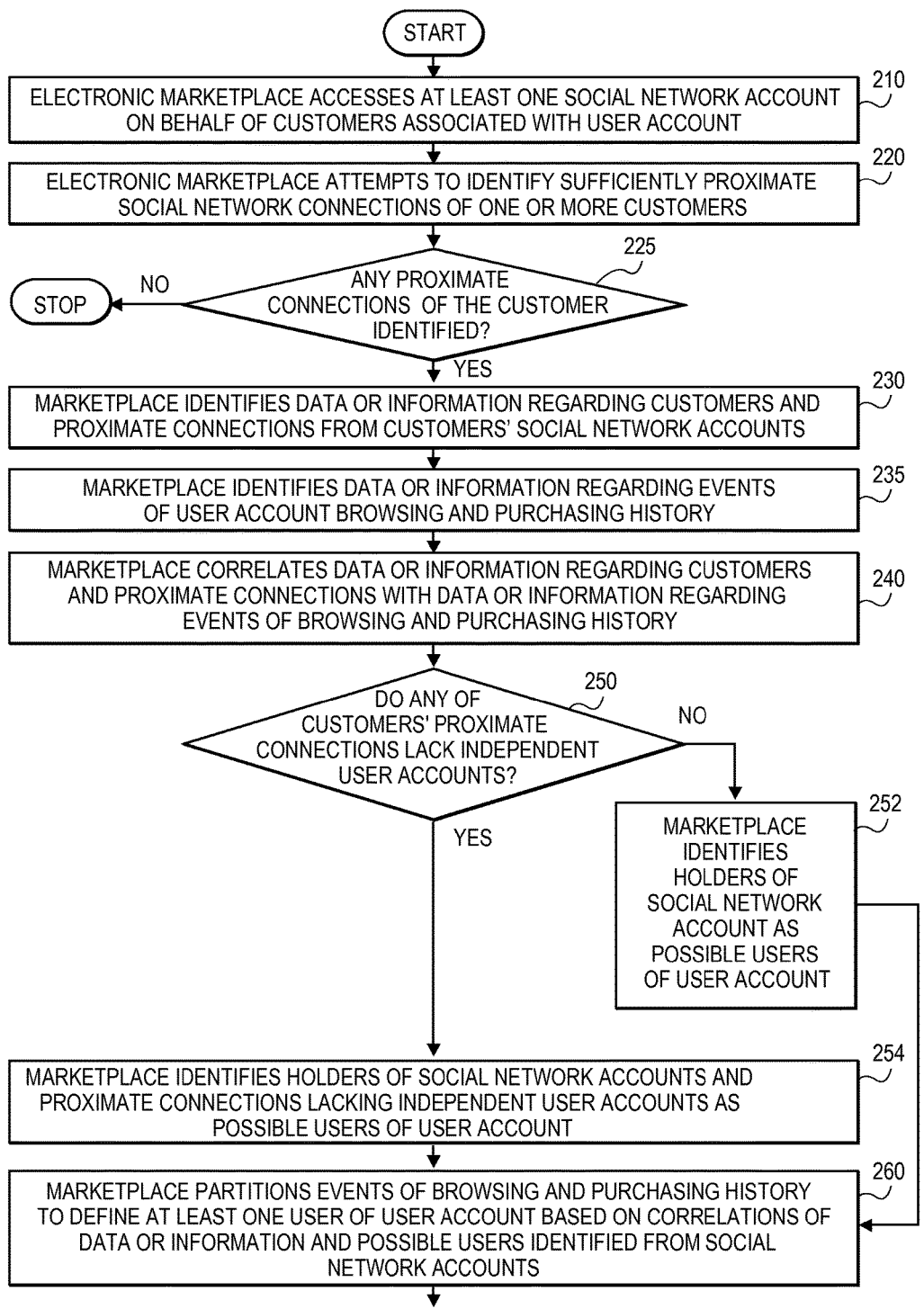
FIG. 2 is a flow chart of a process for providing product recommendations based on user interactions, in accordance with embodiments of the present disclosure.
Figure 2:
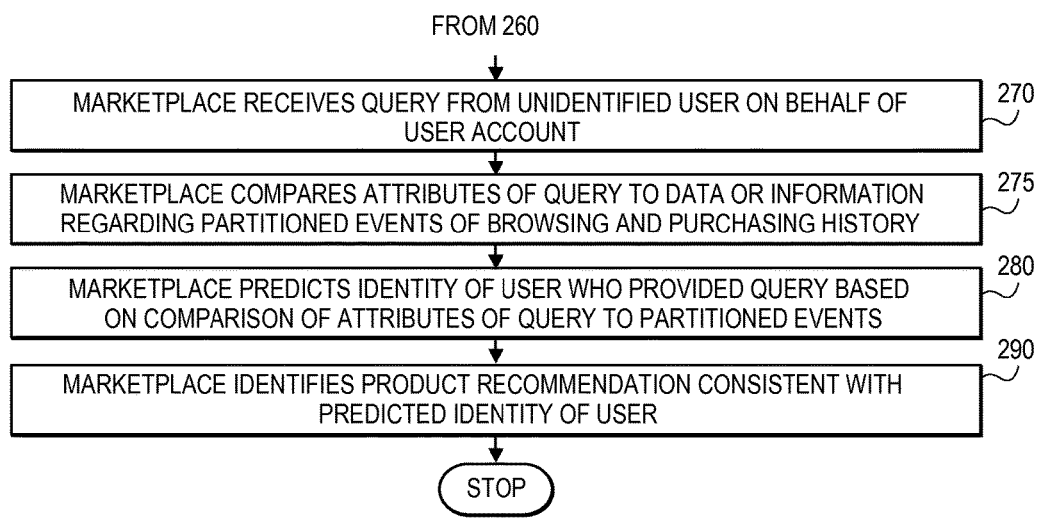

Referring to FIG. 2, a flow chart 200 of one process that may be performed by a system for providing product recommendations based on user interactions is shown. At step 210, an electronic marketplace accesses at least one social network account on behalf of one or more customers who are associated with a user account. For example, a web site maintained by the marketplace may include one or more widgets that enable users to enter their social network account user names and/or passwords therein, and to authorize the marketplace to access some or all of the data regarding the customer that may be maintained at the social network. Alternatively, where the information maintained at the one or more social network accounts is open to the public, the marketplace may identify a social network account as affiliated with a customer, such as by the customer's name, electronic mail address or other identifier that may be known regarding the customer.

At step 220, the marketplace attempts to identify one or more sufficiently proximate social network connections of the one or more customers based on information maintained at the social network. For example, the marketplace may identify friends or family members of the customers either through the customers' direct, express statements (e.g., in user profiles maintained at the social network, or postings at the social network), or through indirect, deductive means based on information included therein (e.g., where the customer refers to another individual as a friend or family member, or vice versa, in one or more postings or comments at the social network).

At step 225, the system determines whether any proximate connections of the customers may be identified from the information maintained in the customers' social network accounts. If no such connections may be identified, then the process ends. If any such connections may be identified, then the process advances to step 230, where the marketplace identifies data or information regarding the customers and their proximate connections that lack their own independent accounts based on information maintained or posted at the customers' social network accounts. For example, the social network accounts may contain information regarding the preferences, interests or past experiences of the customer and/or his or her proximate connections. Such information may refer to aspects of any favorite items or types of items (e.g., colors, sizes, dimensions, features, categories or intended uses of items), and may be expressed in the text or images associated with one or more postings at the social network accounts of the customers, including the text or images of any hyperlinked content posted thereon.

At step 235, the marketplace identifies data or information regarding one or more events in a browsing or purchasing history of the user account. For example, the marketplace may analyze the various items that were purchased on behalf of the user account, or were evaluated for purchase on behalf of the user account, and identify any associated attributes, aspects or other information regarding such events or such items. The attributes, aspects or other information may reference any element of the respective events or of any items associated therewith, including the dates, times or other information associated with the events, or the features, attributes, dimensions or specifications of the items.

At step 240, the marketplace correlates the data or information regarding the customers and any proximate connections who lack their own independent user accounts at the online marketplace that were identified at step 230 with the data or information regarding the events of the browsing or purchasing history associated with the user account that was identified at step 235. For example, where a customer is determined to have a preference for sweatshirts or the color blue based on the information made available or obtained from the customer's social network account, and one of the events in the browsing or purchasing history of the user account at the online marketplace is a purchase of a National Flag Blue sweatshirt, then the purchase of the National Flag Blue sweatshirt may be associated with the customer. Where one of the customer's proximate connections who lacks an independent user account is determined to regularly access the social network within a particular window of time each day, and one of the events in the browsing or purchasing history of the user account is the evaluation of a portable outdoor grill for purchase within the particular window of time on a given day, then an interest in the portable outdoor grill in particular, or in camping or tailgating equipment in general, may be associated with the proximate connection who evaluated the portable outdoor grill within the particular window of time.

At step 250, the marketplace searches its user account records in order to determine whether any of the customers' proximate connections maintain their own independent user accounts at the marketplace. For example, if a friend or family member of a customer does not have his or her own independent user account, then such a friend or family member may possibly also make purchases from the same user account as the customer. Conversely, those friends or family members of the customer who have their own independent user accounts are not likely to also make purchases from the same user account as the customer. If none of the customer's proximate connections lacks an independent user account at the marketplace (or, alternatively, if each of the customer's proximate connections holds an independent user account), then the process advances to step 252, where the marketplace identifies the holders of the various social network accounts that were accessed at step 210 as possible users of the user account. If any of the customer's proximate connections lacks an independent user account at the marketplace, then the process advances to step 254, where the holders of the various social network accounts that were accessed at step 210 and such proximate connections are identified as possible users of the user account.

At step 260, the marketplace partitions the events of the browsing or purchasing history to define one or more users of the user account (e.g., the customer and/or one or more of his or her proximate connections who lacks an independent user account), based on the correlations of data or information obtained at step 240, and the identifications of possible users of the user account at step 252 or step 254. Such events may be clustered, grouped or otherwise partitioned based on an express interest in items associated with such events as identified by the customer or by one or more of his or her proximate connections who lacks an independent user account, based on any implied or deduced interest in such items that may be determined from the information maintained in the customer's social network account, or based on any other factors.

At step 270, the marketplace receives a query from an unidentified user on behalf of the user account. For example, the user (e.g., an authorized user of the user account) may log into the marketplace and search for or select one or more items, or otherwise express an interest in one or more items, such as by viewing or selecting an advertisement, a link or other feature corresponding to the one or more items at the marketplace. At step 275, the marketplace compares any attributes of the user's query (e.g., the time or date of the query, the browser, computing platform or IP address from which the query was provided, or any item associated with the query) to the data or information regarding the partitioned events of the browsing or purchasing history of the user account. For example, where the query was received from the user on a particular day of the week or from a particular type of computing device, the query may be associated with one or more of the purchasing events that occurred at on the particular day of the week or from the particular type of computing device. Where the query includes a request for a particular item, the query may be associated with one or more of the purchasing events associated with the browsing for, or the purchase of, the particular item or a related item.

At step 280, the marketplace predicts the identity of the user who provided the query based on the comparison of the attributes of the query to the data or information regarding the partitioned events of the browsing or purchasing history. For example, where the partitioning of the events of the browsing or purchasing history at step 260 identifies multiple specific users of the user account, and where the comparison of the attributes of the query to the partitioned events of the browsing or purchasing history refers to one of the multiple users, that user may be identified as the user who provided the query. At step 290, an appropriate product recommendation that is consistent with the predicted identity of the user is identified, and the process ends.

Accordingly, the systems and methods of the present disclosure may be utilized to identify any individuals associated with a customer who may be deemed likely to purchase items from an online marketplace using the same user account as the customer, based on information maintained at an external resources such as a social network account. Once such individuals have been identified, the individuals may be correlated with respect to events of the purchasing history of the user account, and recommendations of items may be tailored to the individuals based on such correlations.

Figure 3A:
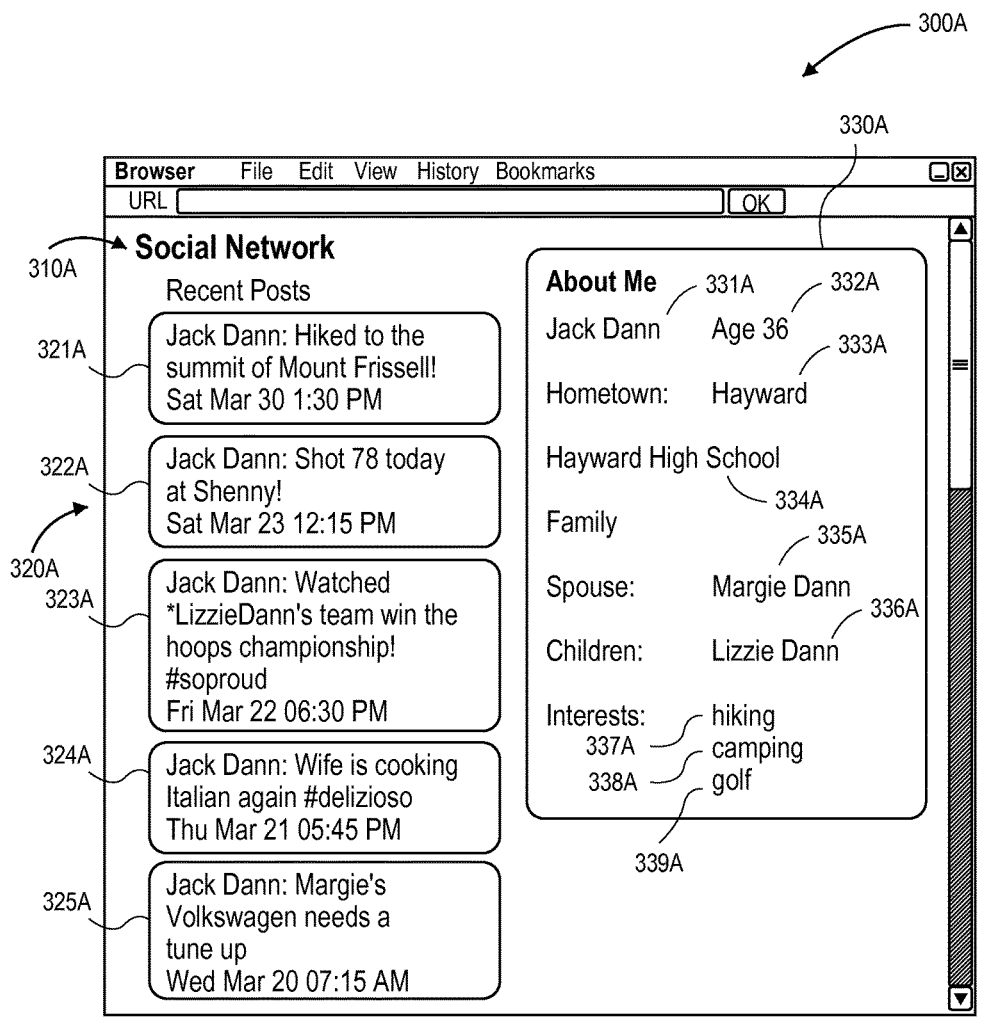
FIGS. 3A and 3B are user interfaces associated with social network accounts, in accordance with embodiments of the present disclosure.
Figure 3B:
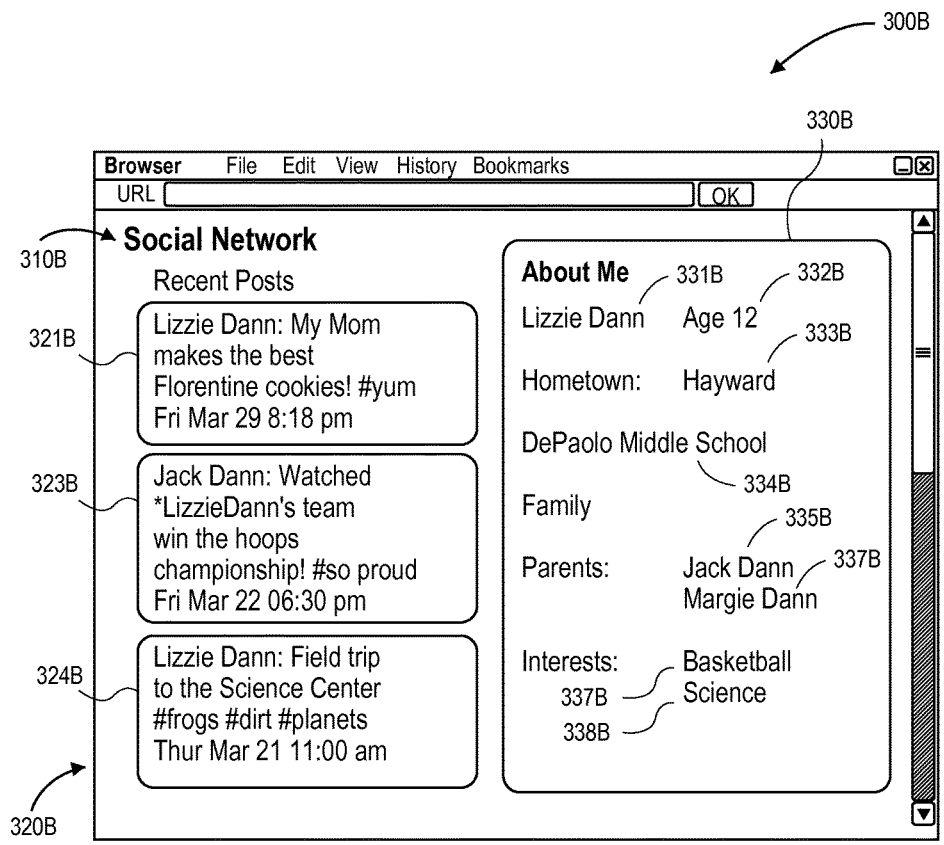

Any information that may be made available at a social network account may be utilized to determine whether items are being purchased from an online marketplace by or on behalf of multiple individuals using a common user account, and, if so, which purchases may be associated with each of the respective individuals. Referring to FIGS. 3A and 3B, user interfaces 300A, 300B displaying web pages 310A, 310B corresponding to activity at respective social networks are shown. As is shown in FIG. 3A, the social network account web page 300A includes a plurality of postings 320A by a member of the social network and a member profile 330A including personal data regarding the member. The postings 320A include information regarding the member, his family or friends, and his currently preferred activities or interests, as well as his opinions on or preferences for particular issues or topics. For example, posting 321A describes a hike up a local mountain by the member, and posting 322A refers to a round of golf recently played by the member. Posting 323A describes an event attended by the member, while posting 324A describes an upcoming meal to be eaten by the member, and posting 325A describes a condition of the member's spouse's automobile. Similarly, the member profile 330A identifies the member 331A and his age 332A, as well as a hometown 333A of the member, an educational institution 334A attended by the member, family members 335A, 336A of the member, and interests 337A, 338A, 339A of the member.

As is shown in FIG. 3B, the social network account web page 300B includes a plurality of postings 320B by a member of the social network and a member profile 330B including personal data regarding the member. The postings 320B include information regarding the member, her family or friends, and her currently preferred activities or interests, as well as his opinions on or preferences for particular issues or topics. For example, posting 321B describes a snack prepared by someone in the member's family (viz., the member's mother). Posting 323B was made by the member associated with the social network account web page 310A of FIG. 3A (viz., the member's father) and corresponds to the posting 323A of FIG. 3A. Posting 324B describes a trip taken by the member to a local science center.

Figure 3C:
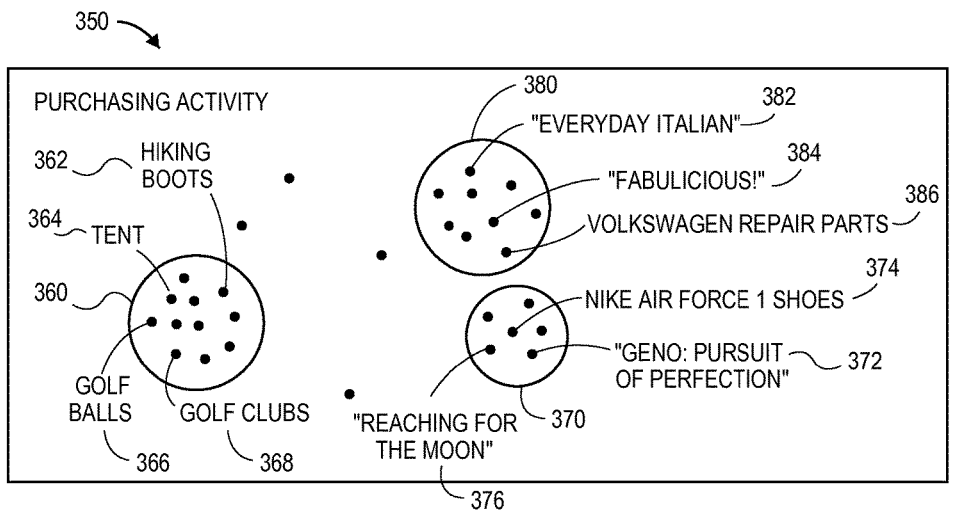
FIG. 3C is a representation of data regarding commercial activity on behalf of a user account, in accordance with embodiments of the present disclosure.

The information identified in one or more social network account web pages, such as the web pages 310A, 310B of FIGS. 3A and 3B, may be harvested and utilized to define one or more groups of browsing or purchasing activity at an online marketplace, and to associate such groups with one or more individuals. Referring to FIG. 3C, a set 350 of data regarding purchases made on behalf of a user account is shown. The set 350 of data includes a first group 360, a second group 370 and a third group 380 of various items. The first group 360 includes items such as hiking boots 362, a tent 364, golf balls 366 and golf clubs 368. The second group 370 includes items such as the book "Geno: In Pursuit of Perfection" 372 by Hall of Fame basketball coach Geno Auriemma, a pair of Nike® Air Force 1 basketball shoes 374 and the book "Reaching for the Moon" by Edwin "Buzz" Aldrin. The third group 380 includes the book "Everyday Italian" 382 by Giada DeLaurentis, the book "Fabulicious!" 384 by Teresa Giudice, and Volkswagen repair parts 386.

As is shown in FIG. 3C, the information made available at one or more social network accounts of members who may be associated with a user account at an online marketplace may be utilized to group or cluster commercial activity around the member and/or one or more other individuals, including the first group 360, the second group 370 and the third group 380 shown in FIG. 3C. For example, the purchasing activity of the first group 360 may be associated with the member having the web page 310A, who is also the father 335B of the member having the web page 310B, in that item 362 corresponds to the information set forth in posting 321A and to one of the interests 337A of the member, and item 364 corresponds to one of the interests 338A of the member. Additionally, items 366, 368 correspond to the information set forth in posting 322A of the member and also to one of the interests 339A of the member.

Similarly, the purchasing activity of the second group 370 may be associated with the spouse 335A of the member of the social network web page 310A, and the mother 336B of the member of the social network web page 310B, based on the information set forth in postings 324A, 325A of FIG. 3A, and the information set forth in posting 321B of FIG. 3B. Finally, the purchasing activity of the third group 330 may be associated with the member having the web page 310B, who is also the child 336A of the member having the web page 310A, based on the information set forth in posting 323A of FIG. 3A, the information set forth in postings 321B, 323B, 324B of FIG. 3B, and the interests 337B, 338B of the member having the web page 310B.

Accordingly, the information made available at a social network account of a customer or other user of an online marketplace, such as the information expressed in the plurality 320A, 320B of postings or the member profiles 330A, 330B of the social network web pages 310A, 310B of FIGS. 3A and 3B, may be utilized to associate the browsing or purchasing activity on behalf of a user account, such as the set 350 of data of FIG. 3C, at an online marketplace with one or more individuals, and to tailor item recommendations for such individuals accordingly.

Figure 4:
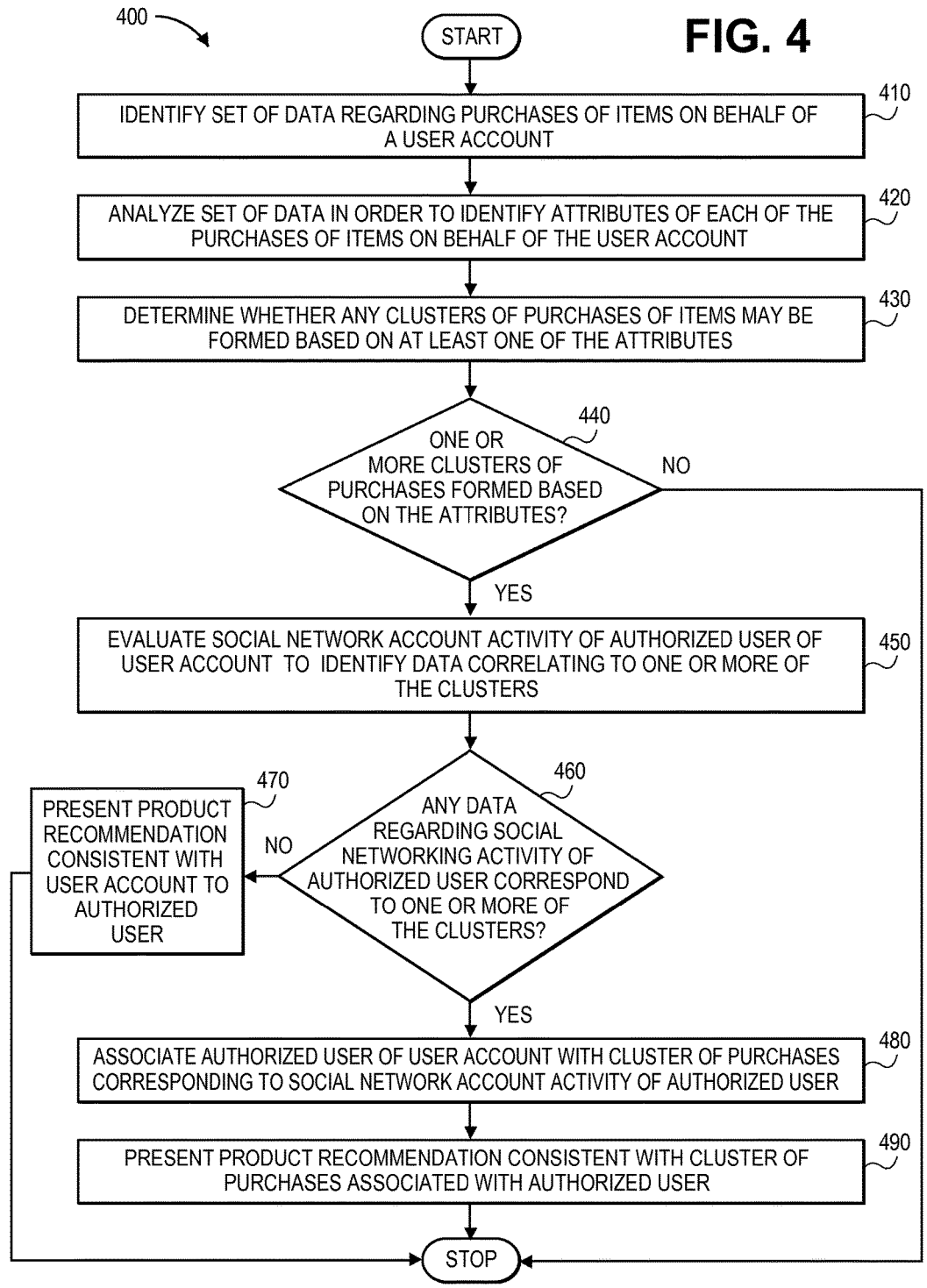
FIG. 4 is a flow chart of a process for providing product recommendations based on user interactions, in accordance with embodiments of the present disclosure.

Similarly, where the browsing or purchasing activity associated with a multi-user account maintained at an online marketplace may be grouped or clustered into one or more segments, the social network interactions of an authorized user of the user account may be used to which of the segments is associated with the authorized user, and to identify a recommendation of an item for the authorized user based on his or her segment. Referring to FIG. 4, a flow chart 400 of one process that may be performed by a system for providing product recommendations based on user interactions is shown. At step 410, a set of data regarding purchases of items on behalf of a user account is identified, and at step 420, the set of data is analyzed in order to identify one or more attributes of each of the purchases of the items. For example, an online marketplace may review the purchasing history of one or more of its user accounts, either singly or collectively, and in one or more online or offline processes, in order to determine any and all attributes (including, but not limited to, the items and/or categories of items that were purchased, the dates or times at which the items were purchased, or the browsers, computing platforms or IP addresses from which the items were purchased) associated with the purchases listed therein.

At step 430, the system determines whether any clusters of purchases of items may be formed based on at least one of the attributes thereof. For example, the purchases may be commonly grouped based on the categories of the items that were purchased, a destination address for the delivery of the purchased items, a time or a date on which the items were purchased, or any other commonality between two or more of the purchases or items. At step 440, if no clusters may be identified based on the attributes of the purchases, then the process ends.

If any clusters of purchases may be identified based on the attributes, then the process advances to step 450, where the system evaluates the social network account activity of an authorized user of the user account in order to identify any available data that may correlate to one or more of the clusters of purchases. For example, one of the authorized users of a user account may provide the system with a user name and/or password associated with his or her social network account, or otherwise permit the system to access an account maintained at the social network on his or her behalf, and the system may search the authorized user's postings, or postings of other users, and identify one or more sets of text, images or media that may relate to one or more of the clusters of purchases. Alternatively, where such information is made publicly available, i.e., without a user name or password, the system may identify a social network account that may be related to an authorized user of the user account, and evaluate the information posted there with respect to one or more of the clusters of purchases.

At step 460, if none of the social network account activity of the authorized user corresponds to any of the clusters, then the process advances to step 470, where a product recommendation that is generally consistent with the user account is provided to the authorized user, and the process ends. For example, if none of the specific clusters of the purchases that were made on behalf of the multi-user account may be conclusively associated with the authorized user based on the social network activity, then a product recommendation that is generally associated with the multi-user account (e.g., a product or category of products in which more than one of the users may be interested) may be presented to the authorized user. If data correlating one or more of the clusters of purchases to the authorized user is available at the social network, then the process advances to step 480, where the system associates the authorized user of the user account with the clusters of purchases corresponding to the social network activity of the authorized user. At step 490, the product recommendation is presented to the authorized user, and the process ends.

Accordingly, where the browsing or purchasing history of a user account at an online marketplace may be grouped or clustered into one or more discrete segments, any information that may be available at one or more social network accounts associated with an authorized user of the user account may be used to associate the authorized user with one or more of the discrete segments. Once the authorized user is associated with a segment of the browsing and purchasing history, an item recommendation that is consistent with the segment may be provided to the authorized user.

The external sources of information that may be relied upon by the systems and methods of the present disclosure in order to identify item recommendations based on interactions of users are not limited to social networks. Rather, any information that may be identified regarding one or more authorized users of a user account maintained at an online marketplace may be utilized to identify such users, or an appropriate recommendation therefor. Referring to FIG. 5, a flow chart 500 of one process that may be performed by a system for providing product recommendations based on user interactions is shown. At step 510, a user accesses a marketplace on behalf of a user account, such as with the entry of a user name or password associated with the user account.

At step 520, the marketplace identifies a browsing or purchasing history of the user account. For example, the marketplace may obtain information regarding items that have been viewed or purchased by users of the user account, either from a historical perspective or within certain defined periods of time. At step 530, the marketplace identifies attributes of each of the events in the browsing or purchasing history, such as the times or dates associated with such events, the browsers, computing platforms or IP addresses from which such events were initiated, or the items or categories of items that were the subject of such events (i.e., viewed or purchased by one or more users of the user account).

At step 540, the marketplace defines one or more groups of the browsing or purchasing history events based on any relationships between each of the respective events based on such attributes. For example, the viewing and/or purchasing of items may be grouped based on any factor, including any times or days on which the items were viewed or purchased, any browsers, computing platforms or IP addresses from which the items were viewed or purchased, or the different items or categories of items that were viewed or purchased, or on any other factor. At step 550, the marketplace identifies any available data regarding the access of the marketplace by the user, such as the time or date of the access by the user; a browser, computing platform or IP address from which the user accessed the marketplace; any web sites visited or other functions performed by the user prior to accessing the marketplace; or one or more items or categories of items viewed by the user.

At step 560, the marketplace compares any available data regarding the access of the marketplace by the user to the attributes associated with the respective groups of events. For example, where the user accessed the marketplace at six o'clock in the evening, the marketplace may determine whether any of the groups of events corresponds to browsing or purchasing activity that occurred on or around six o'clock in the evening in the past. Similarly, where the user accessed the marketplace from a specific browser or device, the marketplace may determine whether any of the groups of events corresponds to browsing or purchasing activity that was initiated from such a browser or using such a device.

At step 570, the system determines whether the data regarding the user's access of the marketplace corresponds to one or more of the attributes associated with the groups of events. If the data does not correspond to any of the groups of events, then the process advances to step 575, where a product recommendation that is generally consistent with the browsing or purchasing history of the user account may be identified. If the data corresponds to one or more of the groups of events, then the process advances to step 580, where the marketplace identifies a product recommendation that is consistent with the one or more groups corresponding to the data. In either event, the process advances to step 585, where the marketplace presents the product recommendation to the user.

At step 590, the marketplace stores the distinctions between the respective groups of events in at least one data store, and the process ends. For example, where the marketplace is successfully able to discern between records corresponding to various groups of purchases in a purchasing history, i.e., between purchases of children's toys and power tools, which may have been purchased from a common user account but have few attributes in common, the distinctions between such groups of items may be utilized in the future to avoid making recommendations of items in one of the groups to customers who viewed or purchased an item from another of the groups.

Accordingly, the systems and methods of the present disclosure may be utilized to identify any relevant data or information regarding the access of an online marketplace by a user of a multi-user account, and to determine, by comparing such data or information to any attributes of items in a browsing or purchasing history of the user account, whether the user may be associated with a specific group or cluster of events in the browsing or purchasing history. If the user may be associated with a specific group or cluster of events in the browsing or purchasing history, then an item recommendation that is consistent with that specific group or cluster may be provided to the user. If the user may not be associated with any one specific group or cluster or events, then an item recommendation that is generally consistent with the user account as a whole may be provided to the user. The distinctions between the items within the various groups or clusters may also be utilized in identifying recommendations of items to customers in the future.

Figure 6B:
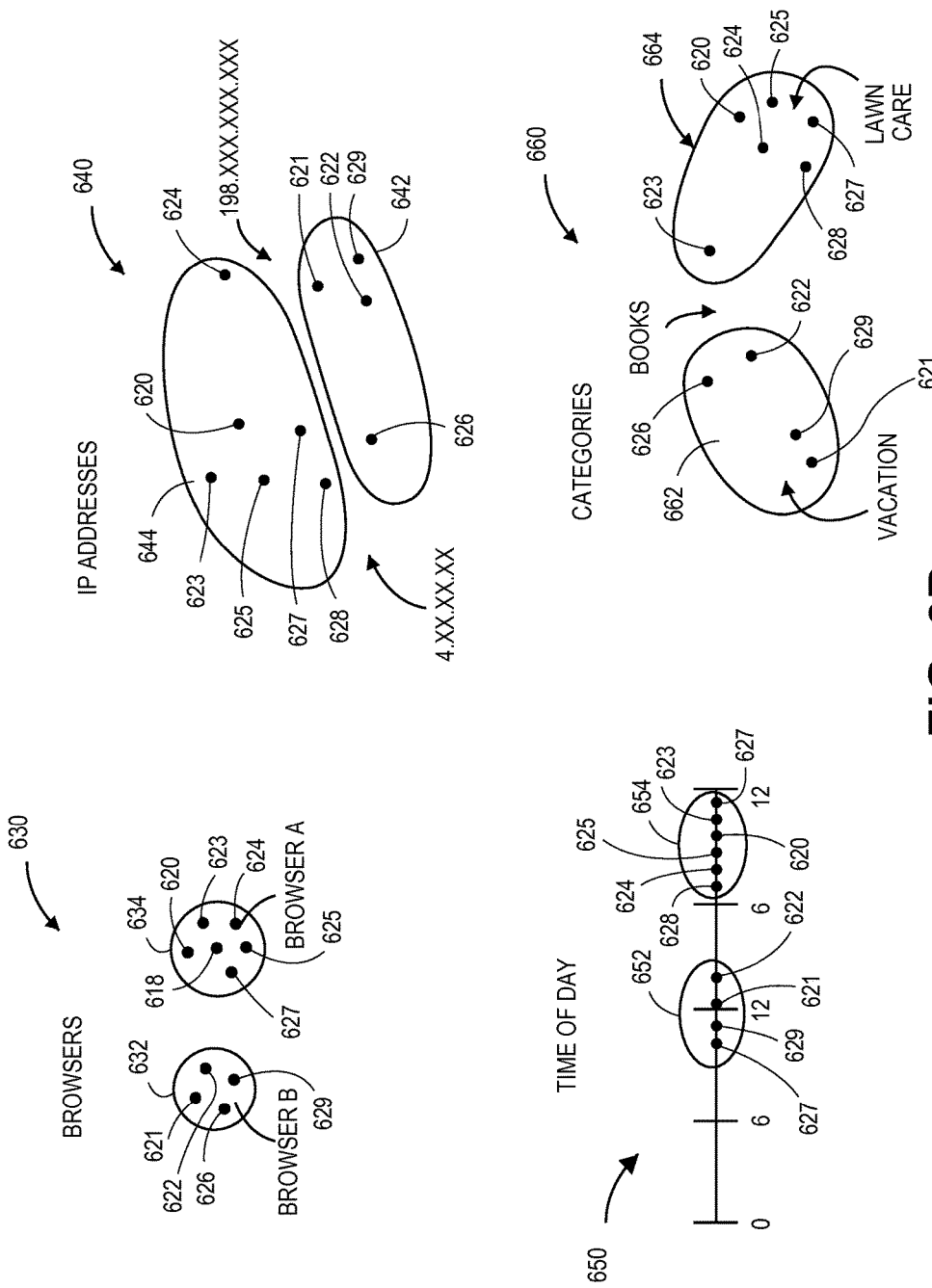

As is discussed above, any relevant information that may be identified regarding the browsing or purchasing activity of a user account may be utilized in order to identify an appropriate item recommendation for an authorized user of the user account. Referring to FIGS. 6A and 6B, a table 600 of data regarding events of a browsing or purchasing history of a user account, as well as the data sorted by attributes 630, 640, 650, 660 of the respective events, are shown.

The table 600 of FIG. 6A features a number of columns 611-618 of data regarding each of the browsing or purchasing events 620-629, including a column 611 identifying a number of the event, columns 612, 613 corresponding to a date and a time of the event, a column 614 identifying a browser associated with the event, a column 615 identifying an IP address from which the event originated, a column 616 identifying an item associated with the event, and columns 617, 618 identifying whether the item was viewed or purchased. Referring to FIG. 6B, the data regarding the events 620-629 of the browsing or purchasing history of FIG. 6A is represented according to various attributes of the events, including the browsers 630 and IP addresses 640 from which the events originated, the times of day 650 at which the events were initiated, and the categories 660 of items that were the subject of the events.

As is discussed above, information regarding the events of a browsing or purchasing history associated with a multi-user account, such as the events 620-629 represented in the table 600 of FIG. 6A, may be grouped or clustered and associated with one or more users of the multi-user account. For example, as is shown in FIG. 6B, where the events 620-629 are sorted according to the browsers 630 from which the events originated, clusters corresponding to two distinct users 632, 634 may be formed. Where the events 620-629 are sorted according to the IP addresses from which the events originated, clusters according to the two distinct users 642, 644 may be formed. Where the events 620-629 are sorted according to the times of day 650 at which the events were initiated, clusters according to the two distinct users 652, 654 may be formed. Finally, where the events 620-629 are sorted according to the categories of items that were the subject of the events, clusters according to the two distinct users 662, 664 may be formed.

Accordingly, where information regarding browsing or purchasing activity associated with a user account may be clustered or grouped based on one or more common features, such clusters or groups may be associated with the individual users of a multi-user account, and an appropriate recommendation of an item consistent with one of the clusters or groups may be provided to each of the individual users.

As is also discussed above, electronic marketplaces may frequently receive orders of items to be delivered to a common location or to a single individual from multiple user accounts. For example, a customer may purchase items for himself or herself from his or her user account, and may also receive items (e.g., as gifts) purchased for himself or herself by other customers from different user accounts. Likewise, a gift recipient may receive items purchased on his or her behalf by a variety of users of different user accounts (e.g., for a birthday, holiday celebration or other special occasion). Where a user intends to purchase an item for an individual or for delivery to a destination, items that were previously purchased for that individual, or items that were previously delivered to that destination, may serve as a basis for identifying recommendations of items to the user that may be appropriate for the individual or for delivery to the destination.

Figure 7:
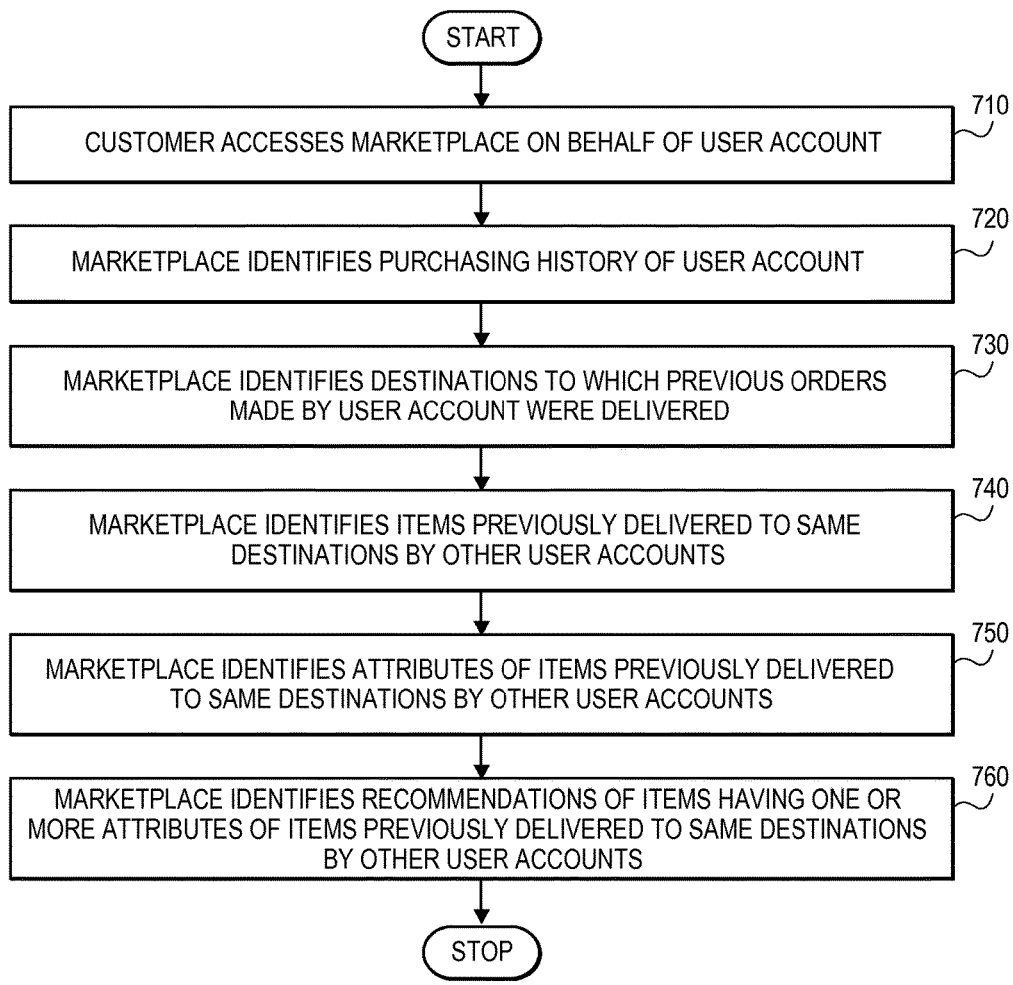
FIG. 7 is a flow chart of a process for providing product recommendations based on user interactions, in accordance with embodiments of the present disclosure.

Referring to FIG. 7, a flow chart 700 of one process that may be performed by a system for providing product recommendations based on user interactions is shown. At step 710, a customer accesses a marketplace on behalf of a user account, such as by using a shopping application 116, 126 of FIG. 1, or by visiting a marketplace web site 134 through a web browser 114, 124 of FIG. 1. At step 720, the marketplace identifies a purchasing history of the user account, i.e., the items or categories of items that were previously ordered on behalf of the user account.

At step 730, the marketplace identifies the destinations to which each of the orders of items was delivered. For example, the destinations may typically include a home or office location of the user, as well as the street addresses or other places to which items that were purchased on behalf of the user account may have been delivered. At step 740, the marketplace identifies one or more items that were previously delivered to such destinations by other user accounts. For example, where a user account was used to purchase a gift for an individual, and the gift was delivered to a destination associated with that individual, other purchases of items (e.g., other gifts) that were delivered to the destination by or on behalf of other user accounts, which may include a user account maintained by that individual.

At step 750, the marketplace identifies one or more attributes of the items that were previously delivered to the same destinations by the other user accounts. For example, the type, number, category, or other features of each of the items that were previously delivered to the destinations may be determined, in order to define a set of interests for at least one person or entity that may be located at that destination. At step 760, the marketplace identifies one or more recommendations of items sharing one of the attributes of the items that were previously delivered to the same destinations by other user accounts, and the process ends. Because the customer has expressed a willingness to purchase and deliver items to those destinations, recommendation of items that may be consistent with the set of interests of one or more people or entities located at that destination may be useful to the customer.

Accordingly, the systems and methods of the present disclosure may be utilized to identify one or more recommendations of items to customers of user accounts that have previously ordered items for delivery to an individual or a destination based on the types, categories or attributes of items that have also been ordered for delivery to the individual or to the destination. Such types, categories or attributes may reflect an interest in or appreciation for such items by the individual or at the destination, and may therefore stand as a valuable source of item recommendations for customers who may be contemplating ordering one or more items for delivery to the individual or the destination.

Those of ordinary skill in the pertinent art would recognize that, in addition to identifying item recommendations based on individuals or destinations to which items were delivered, the systems and methods of the present disclosure may be utilized to identify purchases of items that may have been made by surreptitious means or with fraudulent intent. For example, the systems and methods disclosed herein may obtain information from social network accounts maintained by one or more authorized users of a user account, or from one or more public means, and identify attributes associated with such users, including but not limited to the types, categories or numbers of items usually purchased on behalf of the user account by such users, or the individuals or locations to which such items are usually delivered. When an item is purchased on behalf of the user account, and slated for delivery to a specific individual or a particular location, any information or attributes regarding the item that was purchased, or either the specific individual or the particular location to which the item is to be delivered, may be compared to the information or attributes that may be identified regarding such users, in order to determine whether the item is consistent with the purchasing history of the authorized users of the user account.

For example, where users of a user account typically purchase items that may be classified in accordance with one or more categories (e.g., baby supplies, sporting goods) and are typically delivered to one or more discrete individuals or locations (e.g., the home or business addresses of the users, or the home or business addresses of a finite number of friends or family members), an item that does not fall into the one or more categories or that is scheduled for delivery to an unknown or inconsistent location may be flagged or otherwise designated as potentially fraudulent, or designated for further analysis. Furthermore, such items may be thus identified according to one or more qualitative or quantitative means, such as a numeric or logical scoring system that may be based on the existence or absence of one or more attributes of an item, of a purchase of the item, or of an individual or destination to which the item is to be delivered.

Moreover, such information or attributes regarding a plurality of purchases of items may be aggregated and collectively analyzed in order to determine whether the purchases of the items are reflective of a pattern of fraudulent activity or other misconduct. Such a pattern may also be identified based on a rate of purchases of the items, or a change in rates of purchases of the items (e.g., a velocity or an acceleration that may be observed with respect to the purchases of the items). For example, where several items are purchased on behalf of multiple user accounts and slated for delivery to a common individual or destination, information may be obtained from one or more social network accounts that may be affiliated with one or more of the user accounts, or from one or more public means, and used to identify attributes associated with such users. Such information and attributes may further be compared to any available information or attributes that may be identified regarding the items that were purchased, the individual or the destination to which such items are to be delivered, in order to determine whether the items were purchased with a fraudulent intent.

By identifying items that have been previously delivered to a common destination or to a single individual by other user accounts, the systems and methods of the present disclosure may also offer customers an opportunity to modify selections of items that a person or entity at the common destination, or the individual for which the items are intended, may already own or possess and may therefore not need or require. For example, where an authorized user of a first user account orders a particular tricycle as a gift for delivery to a child, and an authorized user of a second user account attempts to order the particular tricycle as a gift for delivery to the child, the systems and methods disclosed herein may provide one or more user interfaces or other features that permit the authorized user of the second user account to modify his or her selections. In such a manner, the systems and methods disclosed herein may improve the experiences of the child, who may avoid having to return a duplicate item to the marketplace, and of the authorized user of the second user account, who may have increased confidence that an item that he or she purchases for the child is both unique and relevant.

Figure 8:
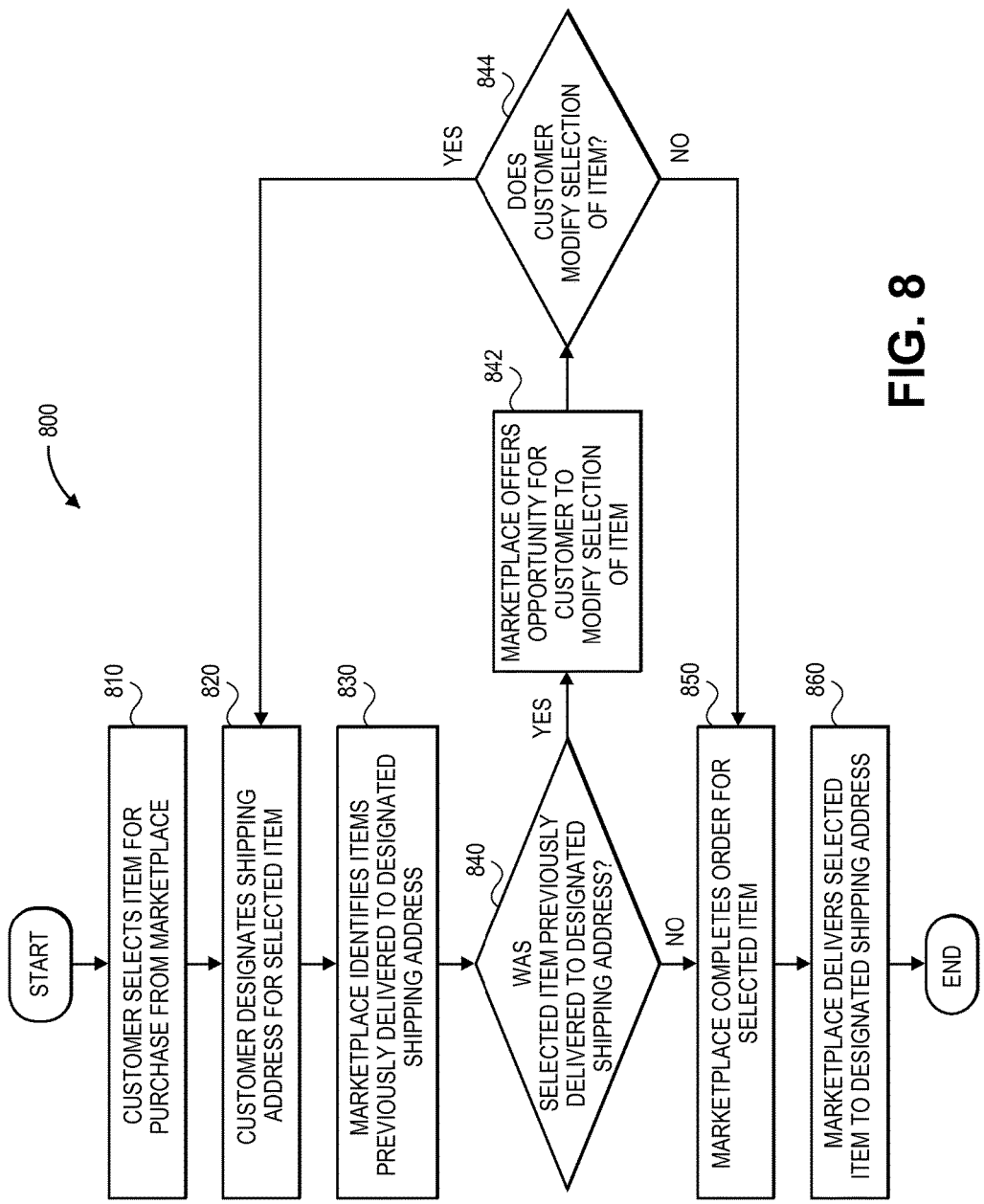
FIG. 8 is a flow chart of a process for providing product recommendations based on user interactions, in accordance with embodiments of the present disclosure.

Referring to FIG. 8, a flow chart 800 of one process that may be performed by a system for providing product recommendations based on user interactions is shown. At step 810, a customer selects an item for purchase from the marketplace, and at step 820, the customer designates a shipping address for the selected item. For example, the customer may select an item for delivery as a gift to a friend, a family member or a co-worker, and identify an address to which the item should be delivered.

At step 830, the marketplace identifies items that were previously delivered to the designated shipping address. For example, upon receiving an identification of the shipping address, the marketplace may review records, data or other information corresponding to items that were previously delivered to that shipping address, either for a defined interval or for an open-ended period of time. Alternatively, or additionally, the marketplace may also identify a name of an intended recipient of the selected item, and identify one or more items that were previously delivered to the intended recipient. At step 840, the marketplace determines whether the item that was selected at step 810 was previously delivered to the designated shipping address, or, alternatively, to the intended recipient. If the item was not previously delivered to the designated shipping address or the intended recipient, then the process advances to step 850, where the marketplace completes an order for the selected item, and to step 860, where the selected item is delivered to the designated shipping address or the intended recipient.

If the item was previously delivered to the designated shipping address or the intended recipient, however, then the process advances to step 842, where the marketplace offers the customer an opportunity to modify his or her selection of the item, i.e., through one or more user interfaces or other means that may inform the customer that a person or entity at the shipping address may already own or possess the item. At step 844, if the customer elects to modify his or her selection of the item, then the process returns to step 820, where the customer designates a shipping address for the modified selection of the item. For example, if a recipient at the designated shipping address may require one or more of the selected item (e.g., a folding chair or a champagne glass), or if the customer recognizes that the recipient may require another one of the selected item (e.g., as a replacement for an originally purchased item), then the customer may decline to modify his or her selection of the item. However, if a recipient usually requires just one of the selected item (e.g., a digital versatile disc, or DVD, of a particular movie, or a copy of a book), then the customer may elect to modify his or her selection of the item for that recipient, to designate a different shipping address for the selected item, or to buy another item for a different recipient.

If the customer does not modify his or her selection of the item, then the process advances to step 850, where the marketplace completes the order for the selected item, and to step 860, where the marketplace delivers the selected item to the designated shipping address.

Accordingly, the systems and methods disclosed herein may enhance the experiences of customers who shop for items at an online marketplace, and recipients of items from the online marketplaces, by identifying potentially duplicate or wasteful purchases of items before such purchases are executed. In this regard, an online marketplace may offer such customers the opportunity to modify their selections of such items, or the shipping addresses to which such items should be delivered, prior to completing orders for such selected items.

Although the process represented in the flow chart 800 of FIG. 8 provides for the modification of a selection of an item if the selected item itself was previously delivered to a common shipping address, the systems and methods of the present disclosure are not so limited. For example, one embodiment of the systems and methods disclosed herein may provide customers with the opportunity to modify selections of items based on their respective categories, i.e., if a customer attempts to purchase a particular brand of bicycle for a recipient who is believed to own a different brand of bicycle, then the systems and methods of the present disclosure may permit the customer to modify his or her selection of the particular brand of bicycle for the recipient.

Likewise, although the process represented in the flow chart 800 of FIG. 8 identifies potentially duplicate selections of items based on the designated shipping addresses thereof, the systems and methods disclosed herein are not so limited, and may further identify such selections based on an identity of the intended recipient thereof. For example, if the intended recipient of a high-definition television may be accurately identified by name as having received the same or similar high-definition television in the past, the customer who is attempting to purchase the high-definition television for the intended recipient may be provided with the opportunity to amend his or her selection thereof.

The systems and methods of the present disclosure may further permit customers to choose whether to make such information regarding their respective purchases available to other customers, i.e., to "opt in," or to "opt out," of systems and methods for product recommendations based on previous deliveries of such items to a customer or a destination, such as the process represented by the flow chart 800 of FIG. 8. For example, where a couple registers a series of items as a part of a gift registry for an upcoming wedding or birth of a child, the couple may permit the marketplace to share information regarding items that have already been purchased on their behalf to customers, in an effort to avoid the unnecessary purchase and delivery of duplicate items to the couple. Alternatively, a customer may elect to withhold information regarding his or her prior purchases of items, or items purchased on behalf of the customer in the past, from other customers in general, or from one or more specific customers, or from consideration by one or more processes for providing product recommendations based on user interactions, such as the process represented in the flow chart 800 of FIG. 8. For example, a customer may decline to participate in such processes for privacy reasons, or may designate one or more purchases of items as exempt from such processes (e.g., where the items are of a personal nature). The systems and methods disclosed herein may display one or more user interfaces or other features that permit customers to elect or decline to participate in such processes, or to select or deselect one or more of such items for consideration by such processes, or to perform any other appropriate or relevant function.

Furthermore, the systems and methods of the present disclosure may also define a time-based or category-based restriction or other limitation associated with the purchase of an item, when determining whether to offer an opportunity to a customer to modify their selections of items based on one or more prior purchases of the items. For example, where a customer has previously purchased a consumable item from a marketplace, such as a bar of soap or a box of diapers, and the customer attempts to purchase another bar of soap or box of diapers from the marketplace, such consumable items are likely legitimately desired by the customer, and will ultimately be used by the customer. Therefore, no such reminder or opportunity may be necessary. Similarly, where a customer has purchased an item having a life expectancy or duration of value that may be estimated or projected, such as a portable battery or gallon of milk, a subsequent selection of the item within the life expectancy or duration of value may cause the systems and methods disclosed herein to provide a reminder or opportunity to modify the selection of the item, while a selection of the item outside the life expectancy or duration of value need not require any such reminder or opportunity, as the item may be desired or required by the customer.

Furthermore, although the process represented in the flow chart 800 of FIG. 8 identifies potentially duplicate selections of items based on previous deliveries of such items, the systems and methods disclosed herein are not so limited, and may also identify items that have been purchased or reserved for a recipient, but have yet to be delivered. For example, where a first customer has pre-ordered a version of a video game for delivery to a recipient in time for Christmas, and a second customer attempts to pre-order the same version of the video game for delivery to the same recipient, the systems and methods of the present disclosure may inform the second customer that the recipient is already slated to receive the version of the video game, and offer the second customer the opportunity to modify his or her selection thereof.

Finally, although the process represented in the flow chart 800 of FIG. 8 identifies potentially duplicate selections of items based on the designated shipping addresses thereof, the systems and methods disclosed herein are not so limited, and may further be utilized to identify items based on a virtual or electronic address associated with the purchase of the item, e.g., where an item may be delivered virtually or electronically, or based on a virtual or electronic notice of the purchase of the item, such as an electronic message to the recipient indicating that the item is available for pickup at a nearby location. In this regard, the systems and methods of the present disclosure may be utilized in connection with any item, including physical or virtual items, such as downloadable audio files, video files or any other information.

Figure 9A:
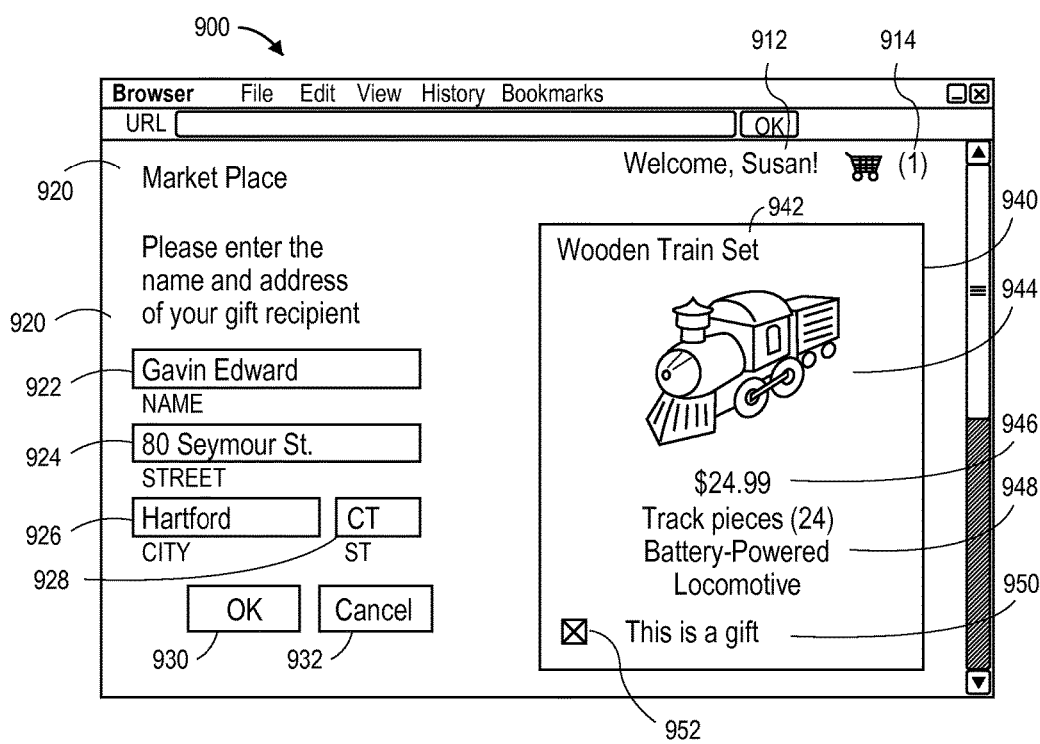
FIGS. 9A, 9B and 9C include user interfaces displayed by systems and methods for providing product recommendations consistent based on user interactions, in accordance with embodiments of the present disclosure.

As is discussed above, a customer who intends to purchase an item for a recipient may be notified of the recipient's ownership, possession or prior purchase of the item by any means, such as through the display of one or more user interfaces. Referring to FIG. 9A, a user interface 900 displaying a product detail page 910 is shown. The product detail page 910 includes a plurality of features 920 which enable a customer to enter shipping information for a selected item (i.e., a name of a recipient and an address to which the item should be delivered), and identifies information 940 regarding the selected item.

The features 920 include a series of text boxes that enable the customer to enter a name 922 of the recipient of the selected item, as well as a street address 924, a town 926 and a state 928 to which the selected item should be delivered. The features 920 further include a pair of buttons 930, 932 or other selectable features that permit the customer to approve or cancel the entry of shipping information. Additionally, the information 940 regarding the selected item includes a name 942 and an image 944 of the selected item, as well as a purchase price 946 and a description 948 of the selected item. Furthermore, the information 940 also includes a check box 950 that may be selected by the customer to indicate that the selected item is intended as a gift.

According to some embodiments of the present disclosure, such as the process represented in the flow chart 800 of FIG. 8, the name 922 of the recipient and/or the destination (viz., the street address 924, the town 926 and the state 928) for the delivery of the item may be compared or otherwise cross-checked against a plurality of records in order to determine whether the item has previously been delivered to either the recipient or the destination. If the recipient or the destination has already received the selected item, the customer may be prompted to modify the selection of the item, such as by selecting a different item to be delivered to the destination, or by selecting a different destination for the selected item.

Figure 9B:
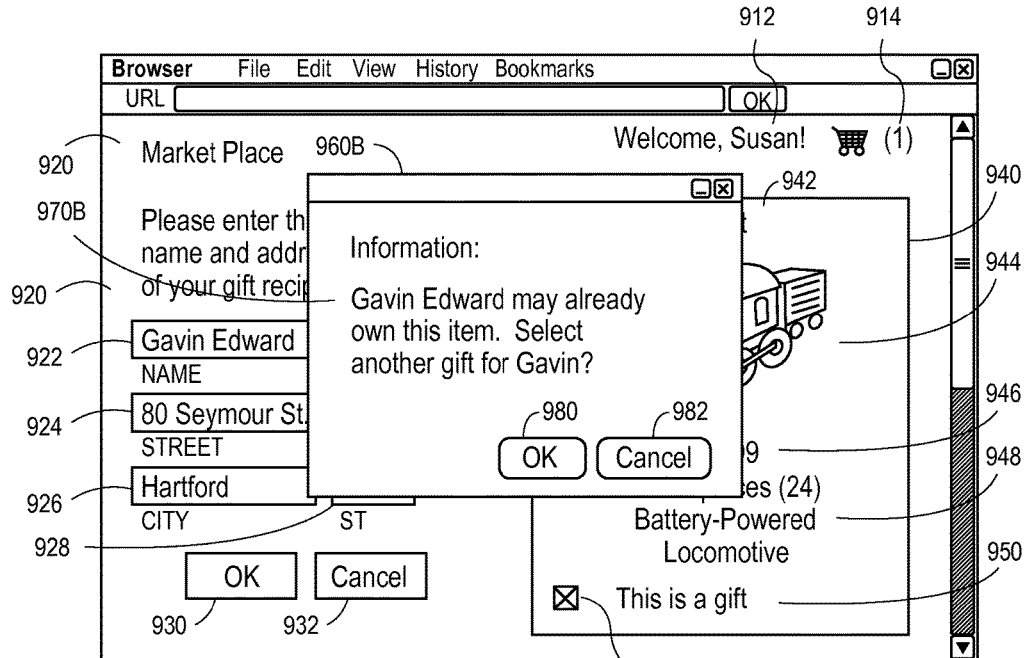
Figure 9C:
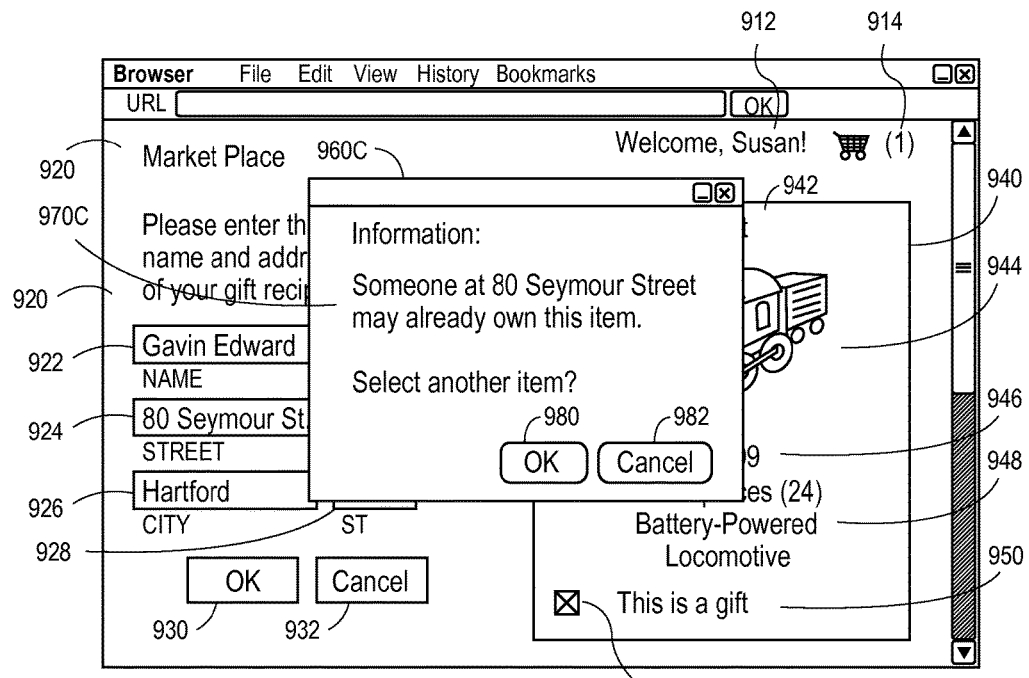

Referring to FIGS. 9B and 9C, pop-up windows 960B, 960C are shown as superimposed on the product detail page 910 of FIG. 9A. Referring to FIG. 9B, the pop-up window 960B includes information 970B regarding the name 922 of the intended recipient of the selected item, and informs the customer that the recipient may already own the selected item. The pop-up window 960B of FIG. 9B further permits the customer to modify his or her selection of the item by selecting button 980, such as in accordance with steps 842, 844 of the flow chart 800 of FIG. 8, or to ignore the warning by selecting button 982. Referring to FIG. 9C, the pop-up window 960C includes information 970C regarding the intended destination for the selected item, and informs the customer that someone at the destination may already own the selected item. As with the pop-up window 960B of FIG. 9B, the pop-up window 960C of FIG. 9C further permits the customer to modify his or her selection of the item by selecting button 980, such as in accordance with steps 842, 844 of the flow chart 800 of FIG. 8, or to ignore the warning by selecting button 982.

Accordingly, as is discussed above, the systems and methods of the present disclosure may be utilized to inform customers that an intended recipient of a selected item may already own or have previously purchased the selected item, or that at least one of the selected item may already be available at the intended destination, and provide such customers with the opportunity to modify their selection of the item before completing an order. In such a manner, the systems and methods disclosed herein may increase the likelihood of a favorable experience for both the customers and the intended recipient, or for others at the intended destination.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular embodiment herein may also be applied, used, or incorporated with any other embodiment described herein. Moreover, with respect to the one or more methods or processes of the present disclosure described herein, including but not limited to the flow charts shown in FIG. 2, 4, 5, 7 or 8, the order in which the methods or processes are listed is not intended to be construed as a limitation on the claimed inventions, and any number of the method or process steps can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey that certain embodiments could include, but do not require, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A computer system comprising at least one computer processor and at least one data store having computer-executable instructions stored thereon,
   wherein the computer system is connected to a communications network and configured to execute the computer-executable instructions to perform a method comprising:
   identifying a plurality of authorized users having access to a user account at an online marketplace using the at least one computer processor;
   identifying social network accounts at a social network of each of the plurality of authorized users using the at least one computer processor;
   accessing at least some of the social network accounts over the communications network using the at least one computer processor;
   obtaining information associated with each of the plurality of authorized users from the at least some of the social network accounts over the communications network using the at least one computer processor;
   identifying at least one attribute of each of the plurality of authorized users based at least in part on the information obtained from the at least some of the social network accounts using the at least one computer processor;
   identifying at least one attribute of each of a plurality of items previously purchased on behalf of the user account at the online marketplace using the at least one computer processor;
   determining that a correlation exists between an attribute of one of the plurality of authorized users and an attribute of a first item using the at least one computer processor, wherein the first item is one of the plurality of items previously purchased on behalf of the user account at the online marketplace; and
   in response to determining that the correlation exists between the attribute of the one of the authorized users and the attribute of the first item,
   identifying a recommendation of a second item for the one of the plurality of authorized users based at least in part on the correlation, wherein the second item is available at the online marketplace, and wherein the second item is not one of the plurality of items previously purchased on behalf of the user account at the online marketplace.

2. The computer system of claim 1, wherein the method further comprises:
   presenting the recommendation of the second one of the plurality of items to the one of the plurality of authorized users.

3. The computer system of claim 1, wherein the information obtained from the social network accounts comprises at least one of:
   a set of text posted by the one of the plurality of authorized users to the social network; or
   a photograph posted by the one of the plurality of authorized users to the social network.

4. The computer system of claim 1, wherein identifying the at least one attribute of each of the plurality of items previously purchased on behalf of the user account at the online marketplace comprises:

defining at least one cluster of the plurality of items previously purchased on behalf of the user account based at least in part on the at least one attribute of each of the plurality of items using the at least one computer processor, wherein the first item is included in the at least one cluster, and wherein determining that the correlation exists between the attribute of the one of the plurality of authorized users and the attribute of the first item:

associating the one of the plurality of authorized users with the at least one cluster using the at least one computer processor, wherein the second item is included in the at least one cluster.

5. The computer system of claim 1, wherein the method further comprises:

receiving authorizations to access the social network accounts of each of the plurality of authorized users over the communications network using the at least one computer processor, wherein the at least some of the social network accounts are accessed over the communications network based at least in part on the authorizations.

6. A computer-implemented method comprising:

identifying at least one attribute associated with each of a plurality of individual events of a browsing or purchasing history on behalf of a first user account held at an online marketplace using at least one computer processor, wherein the first user account has a plurality of authorized users;

obtaining at least one attribute regarding at least a first authorized user of the first user account from at least one external resource using the at least one computer processor, wherein the first authorized user is one of the plurality of authorized users;

determining a correlation of the at least one attribute associated with one of the events to the at least one attribute regarding the first authorized user using the at least one computer processor;

determining that the one of the events is associated with the first authorized user using the at least one computer processor based at least in part on the correlation;

identifying a first item recommendation for the first authorized user based at least in part on the correlation using the at least one computer processor;

storing the first item recommendation in association with the first authorized user in at least one data store, wherein the first item recommendation identifies an item that is available for purchase from the online marketplace; and presenting the first item recommendation to the first authorized user.

7. The computer-implemented method of claim 6, wherein the at least one external resource is a social network account of the first authorized user.

8. The computer-implemented method of claim 6, wherein the one of the events is a purchase of an item from the online marketplace by the first authorized user or an evaluation of the item for purchase from the online marketplace by the first authorized user.

9. The computer-implemented method of claim 7, further comprising:

receiving an authorization to access the social network account of the first authorized user on behalf of the first authorized user, using the at least one computer processor, wherein the at least one attribute regarding the at least one of the plurality of authorized users of the first user account comprises at least one of a set of text, an image, an audio file, a video file or a hyperlinked resource posted by the first authorized user to the social network account of the first authorized user.

10. The computer-implemented method of claim 9, wherein receiving the authorization to access the social network account of the first authorized user on behalf of the first authorized user comprises:

receiving at least one of a user name or a password associated with the social network account of the first authorized user through a user interface provided by the online marketplace.

11. The computer-implemented method of claim 9, further comprising:

identifying a connection to the first authorized user based on the at least one attribute regarding the at least one of the plurality of authorized users.

12. The computer-implemented method of claim 11, wherein the one of the events is a purchase of an item from the online marketplace by the connection to the first authorized user or an evaluation of the item for purchase from the online marketplace by the connection to the first authorized user.

13. The computer-implemented method of claim 11, wherein the first item recommendation is associated with the connection to the first authorized user.

14. The computer-implemented method of claim 6, wherein the at least one attribute associated with each of the plurality of the events is at least one of:

a date of the event;
a time of the event;
a browser from which the event was originated;
a computing platform from which the event was originated;
an Internet Protocol address from which the event was originated;
a shipping address associated with the event; or
an attribute of an item associated with the event.

15. The computer-implemented method of claim 6, wherein the at least one attribute regarding the at least one of the plurality of authorized users of the first user account is at least one of:

an identity of a connection of the at least one of the plurality of authorized users;
an identity of a family member of the at least one of the plurality of authorized users;
an interest in a category of items by the at least one of the plurality of authorized users;
an interest in the category of items by the connection of the at least one of the plurality of authorized users; or
an interest in the category of items by the family member of the at least one of the plurality of authorized users.

16. The computer-implemented method of claim 6, wherein determining the correlation of the at least one attribute associated with the one of the events to the at least one attribute regarding the first authorized user comprises:

defining at least one cluster of the events based on the at least one attribute associated with each of the events using the at least one computer processor; and
associating the at least one attribute regarding the first authorized user with the at least one cluster.

17. The computer-implemented method of claim 16, wherein identifying the first item recommendation for the first authorized user based at least in part on the correlation comprises:

selecting an item associated with the at least one cluster.

18. The computer-implemented method of claim 6, wherein presenting the first item recommendation to the first authorized user comprises at least one of:
   causing a display of information regarding the item that is available for purchase from the online marketplace using the at least one computer processor; or
   delivering a message comprising information regarding the item that is available for purchase from the online marketplace to the first authorized user.

19. The computer-implemented method of claim 6, further comprising:
   identifying an attribute regarding a person associated with the first authorized user based on the at least one attribute regarding at least the first authorized user obtained from the external resource using the at least one computer processor.

20. The computer-implemented method of claim 19, further comprising:
   determining whether the person is associated with a second user account held at the online marketplace using the at least one computer processor; and
   in response to determining that the person is not associated with the second user account,
   correlating the attribute associated with the one of the events with the at least one attribute regarding the person using the at least one computer processor.

21. The computer-implemented method of claim 6, wherein the at least one external resource is a record comprising at least one of:
   an address of the first authorized user;
   an identity of a connection of the first authorized user; or
   an identity of a family member of the first authorized user.

\* \* \* \* \*